(12) United States Patent
Aoki

(10) Patent No.: US 9,939,634 B2
(45) Date of Patent: Apr. 10, 2018

(54) ZOOM LENS AND IMAGE PICKUP APPARATUS HAVING THE SAME

(71) Applicant: CANON KABUSHIKI KAISHA, Tokyo (JP)

(72) Inventor: Koji Aoki, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/316,964

(22) PCT Filed: Jun. 4, 2015

(86) PCT No.: PCT/JP2015/066801
§ 371 (c)(1),
(2) Date: Dec. 7, 2016

(87) PCT Pub. No.: WO2015/190540
PCT Pub. Date: Dec. 17, 2015

(65) Prior Publication Data
US 2017/0115482 A1 Apr. 27, 2017

(30) Foreign Application Priority Data

Jun. 10, 2014 (JP) .................................. 2014-119440
Apr. 24, 2015 (JP) .................................. 2015-089583

(51) Int. Cl.
*G02B 15/14* (2006.01)
*G02B 27/00* (2006.01)

(52) U.S. Cl.
CPC ......... *G02B 27/0025* (2013.01); *G02B 15/14* (2013.01)

(58) Field of Classification Search
CPC ...... G02B 13/009; G02B 15/14; G02B 15/16; G02B 15/173; G02B 15/28
(Continued)

(56) References Cited

U.S. PATENT DOCUMENTS

2013/0176629 A1* 7/2013 Nakayama ............. G02B 15/14
                                                                 359/696
2014/0029111 A1    1/2014 Shibata
(Continued)

FOREIGN PATENT DOCUMENTS

JP    H09-251127 A    9/1997
JP    2001-242380 A   9/2001
(Continued)

OTHER PUBLICATIONS

Notification Concerning Transmittal of International Preliminary Report on Patentability (Chapter 1 of the Patent Cooperation Treaty) issued in corresponding application No. PCT/JP2015/066801 dated Dec. 22, 2016.
(Continued)

*Primary Examiner* — William Choi
(74) *Attorney, Agent, or Firm* — Carter, DeLuca, Farrell & Schmidt, LLP

(57) ABSTRACT

To obtain a zoom lens easily performing image blur correction and maintaining optical performance while performing image blur correction while restricting an increase in size of the lens. A zoom lens including, in order from an object side: a positive first unit; a negative second unit; a positive third unit; and a rear group that has one or more units. Spacings between adjacent units change during zooming. First and second correction systems rotatable about first and second centers on or in the vicinity of an optical axis during blur correction are respectively constituted by at least a part of the second unit and at least a part of an optical system disposed on image side of the second unit. The first and second centers are on image side of a surface vertex of the respective first and second correction systems closest to the object side.

18 Claims, 19 Drawing Sheets

(58) Field of Classification Search
USPC .................................. 359/676, 683, 689, 690
See application file for complete search history.

(56) References Cited

U.S. PATENT DOCUMENTS

2015/0185493 A1   7/2015   Aoki
2016/0299338 A1   10/2016  Aoki

FOREIGN PATENT DOCUMENTS

| JP | 2001-249276 A | 9/2001 |
| JP | 2003-202499 A | 7/2003 |
| JP | 2003-295250 A | 10/2003 |

OTHER PUBLICATIONS

International Search Report and Written Opinion of the International Searching Authority dated Sep. 8, 2015 in corresponding International Application No. PCT/JP2015/066801, 10 pages.
European Partial Search Report dated Jan. 24, 2018 in corresponding Application No. 15806796.7, 12 pgs.

* cited by examiner

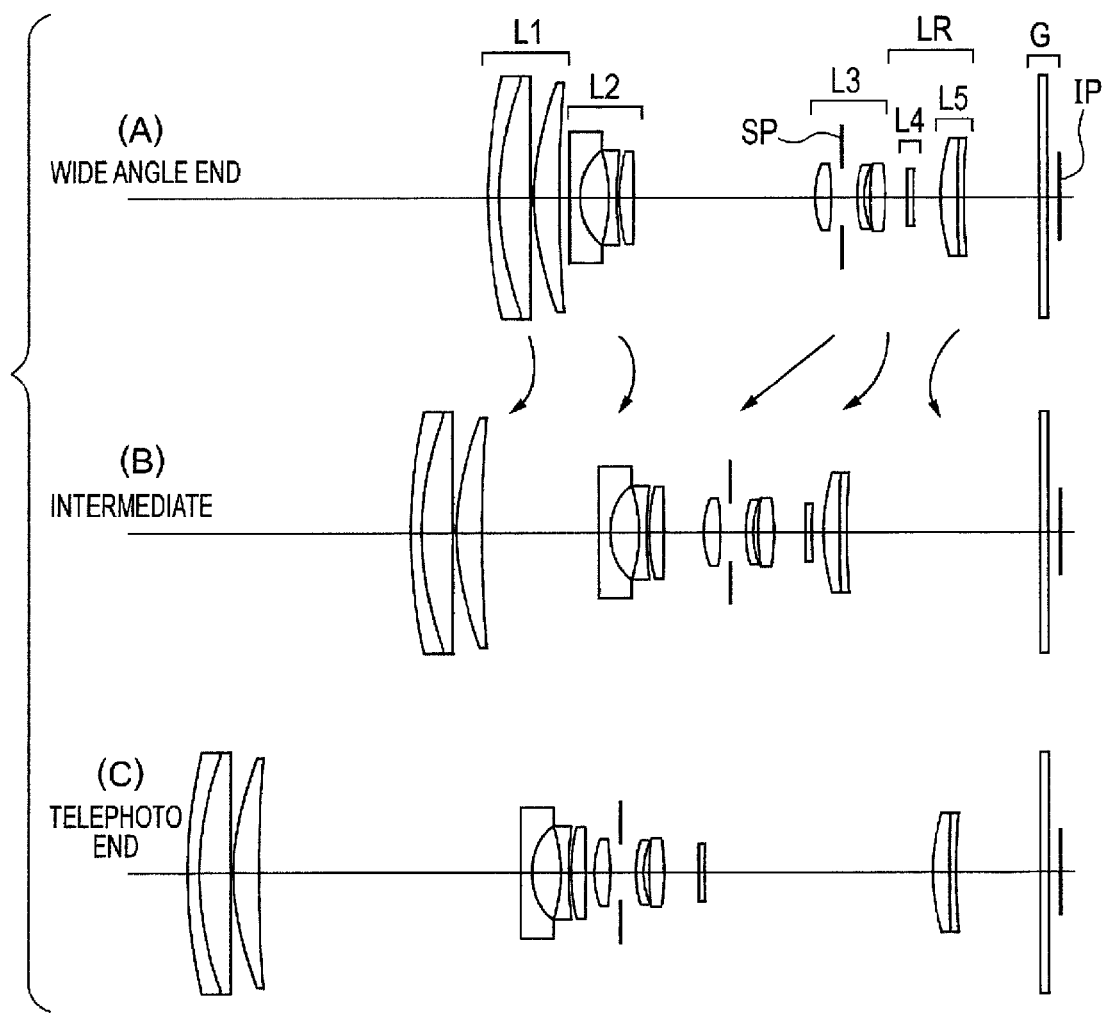

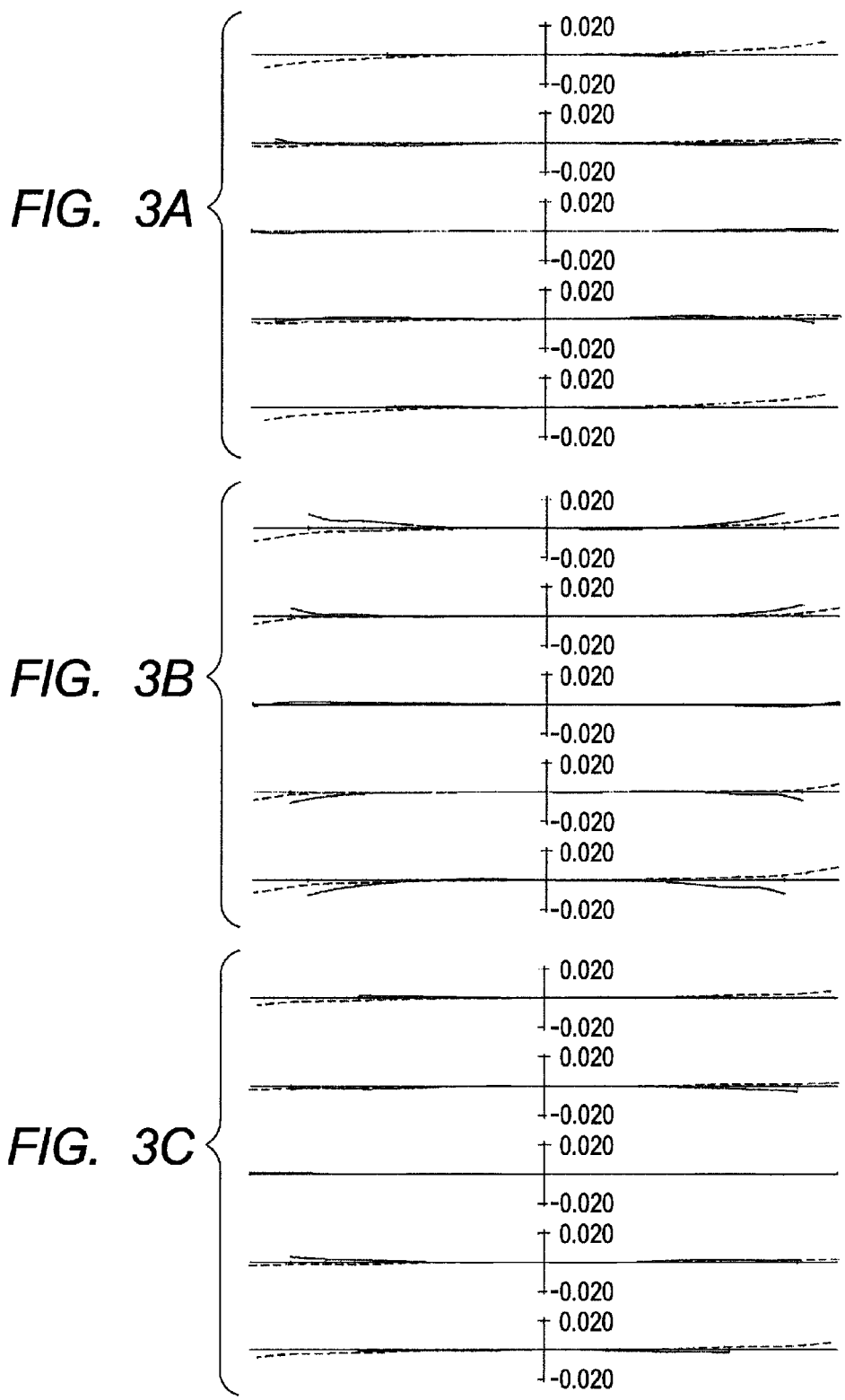

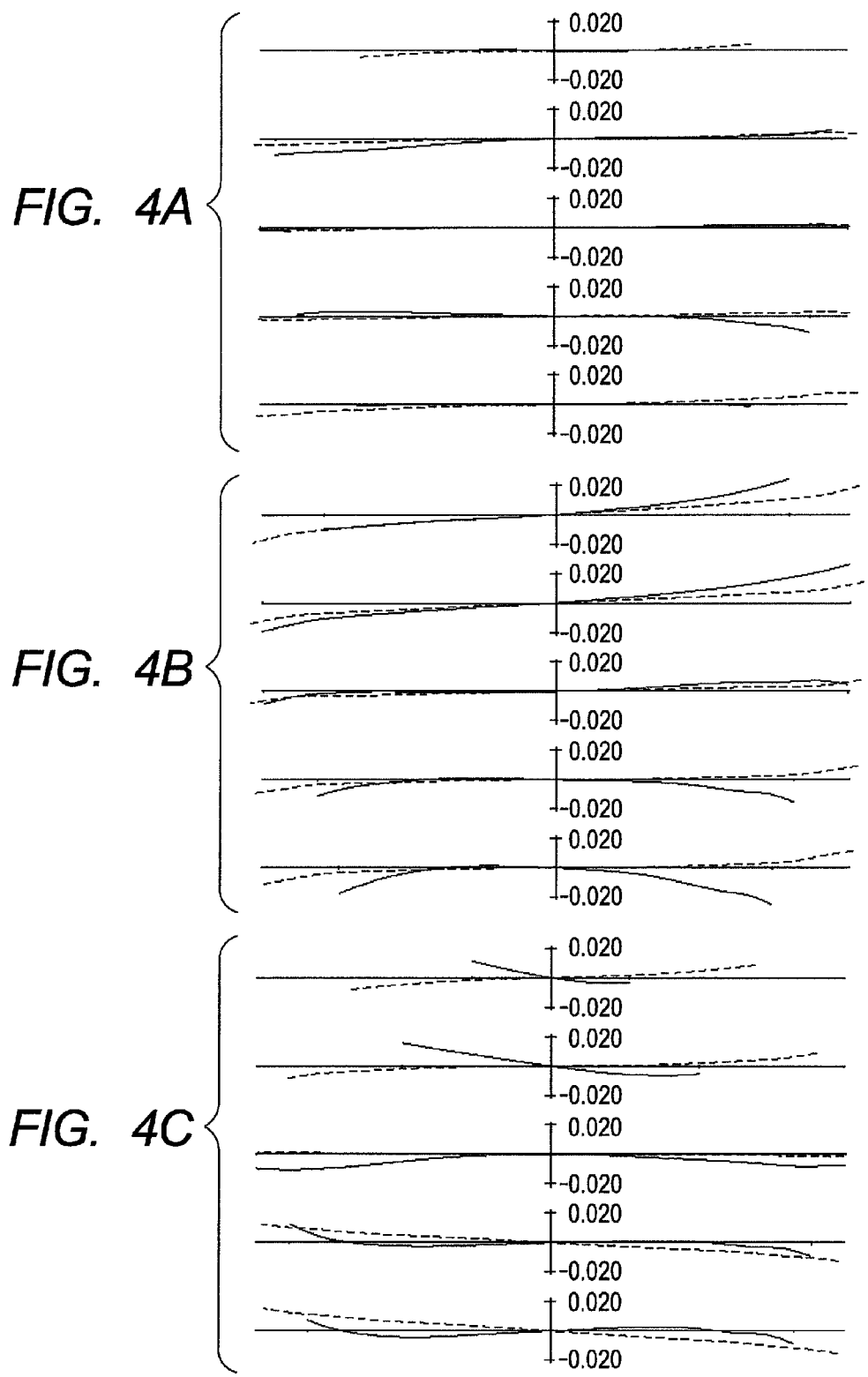

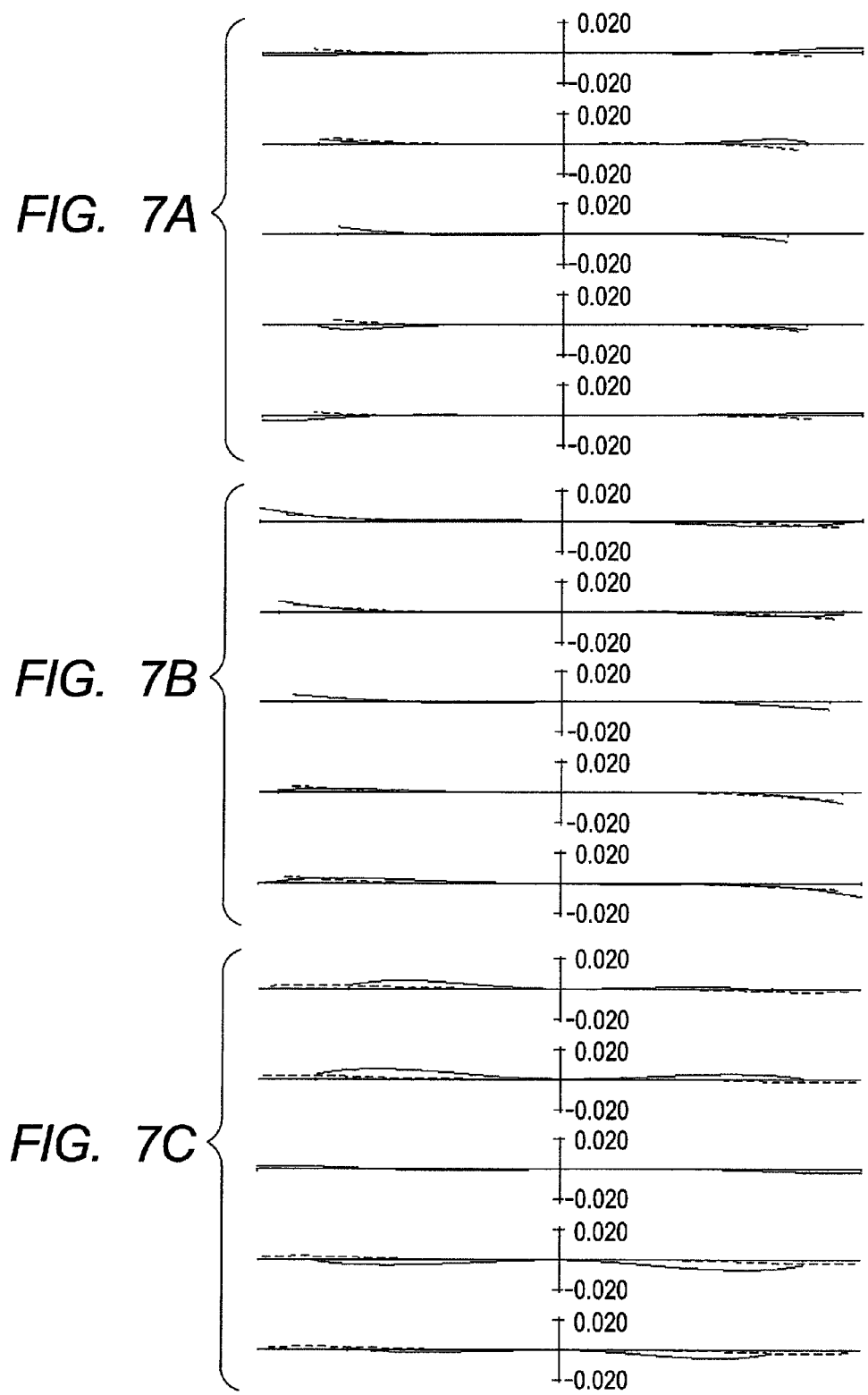

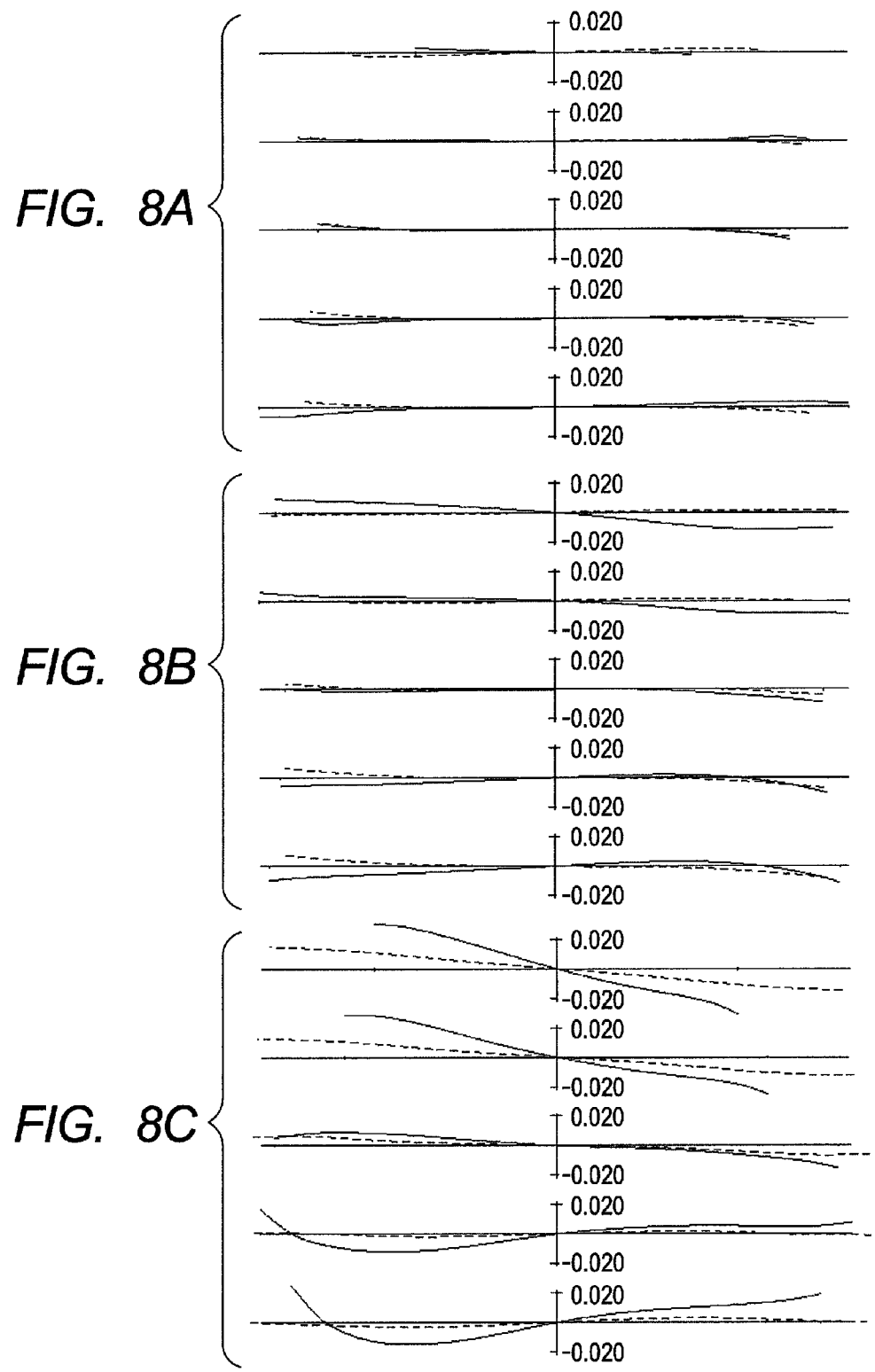

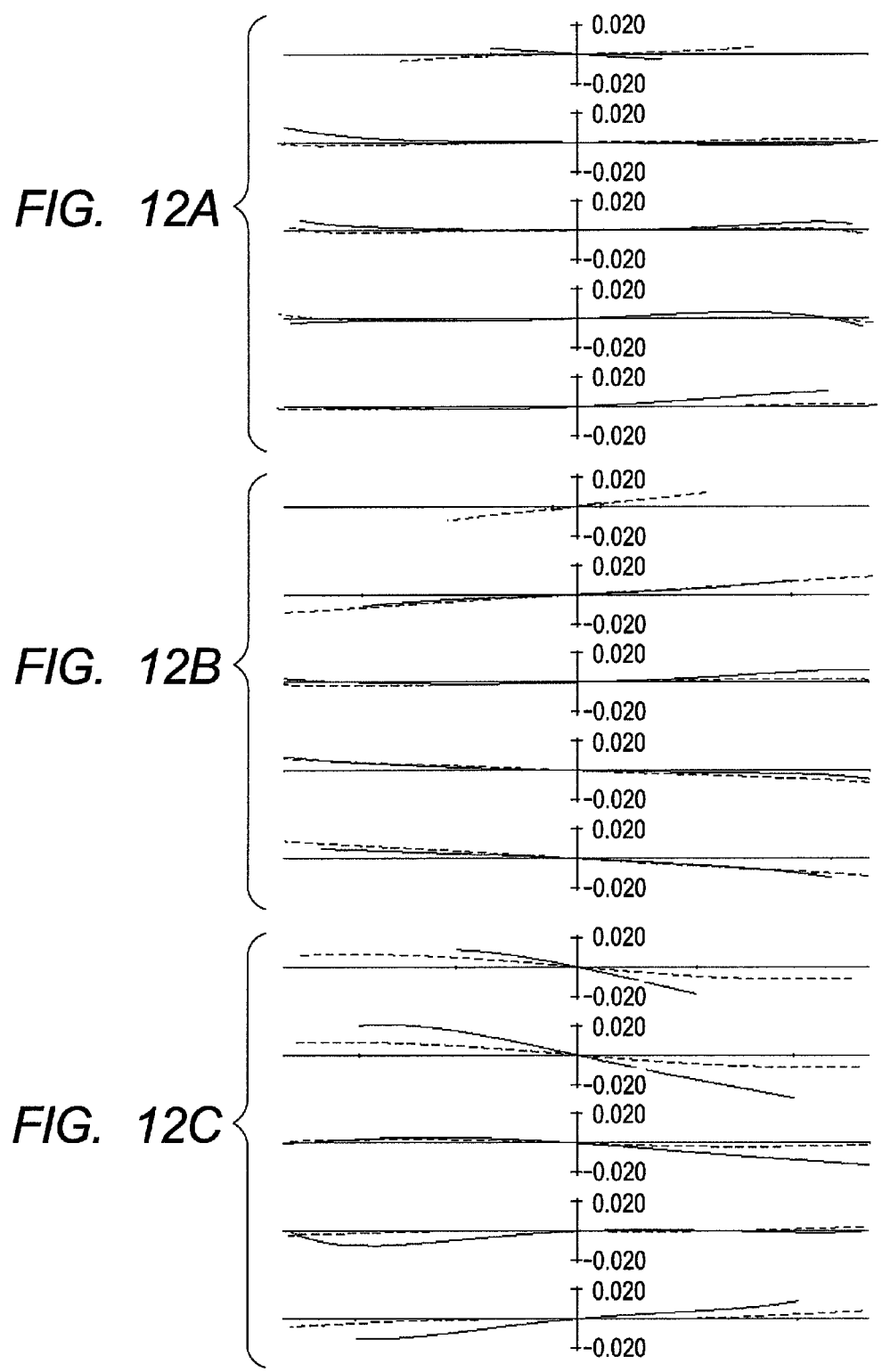

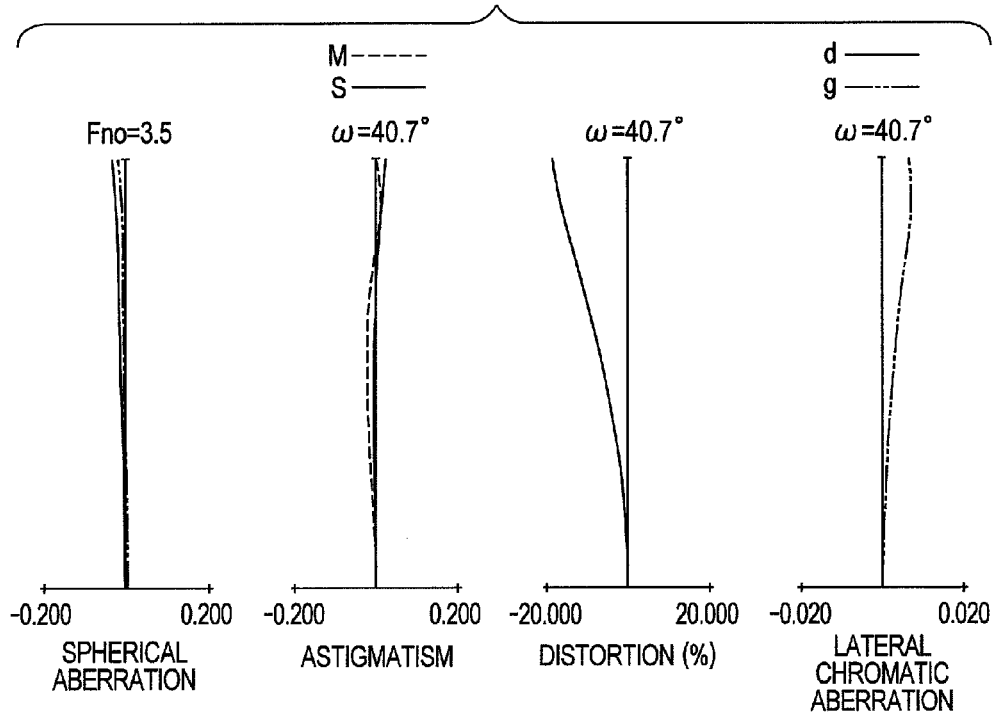
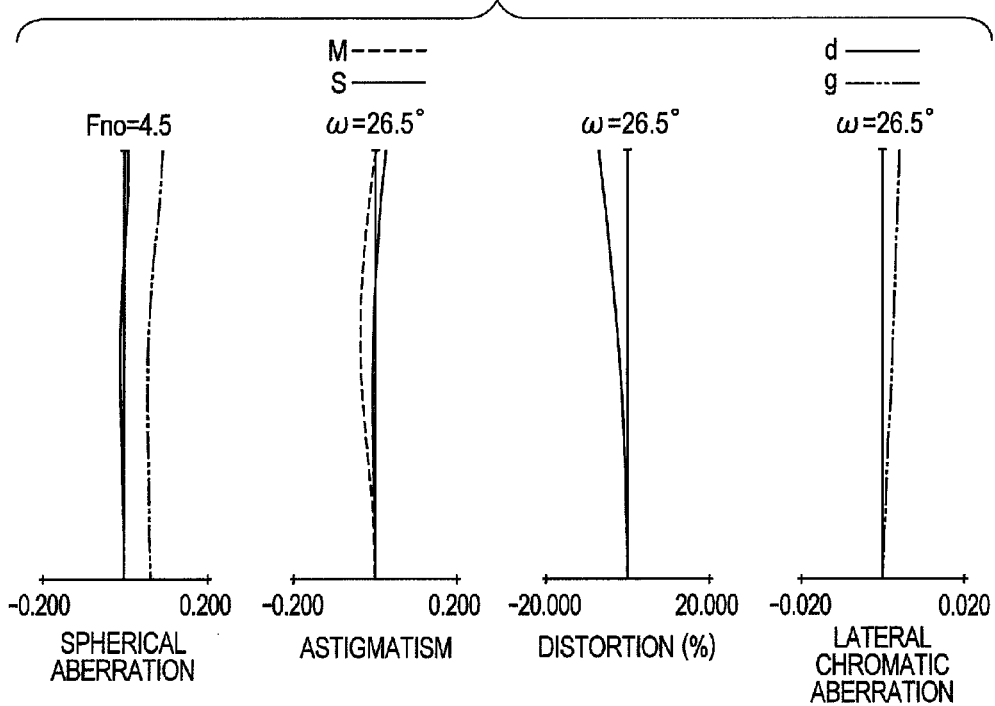

ZOOM LENS AND IMAGE PICKUP APPARATUS HAVING THE SAME

TECHNICAL FIELD

The present invention relates to a zoom lens and an image pickup apparatus having the same. For example, the present invention is remarkably suitable for: an image pickup apparatus using an image pickup element such as a video camera, an electronic still camera, a broadcasting camera, or a surveillance camera; an image pickup apparatus such as a camera using a silver halide film; and the like.

BACKGROUND ART

There is a demand for a zoom lens, of which a total lens length (a distance from a first lens surface to the image plane) is short and a size of the zoom lens is small and which has high optical performance in the entire zoom range with a high zoom ratio, as an optical image pickup system used in an image pickup apparatus. Further, there is also a demand for a zoom lens having means for correcting image blur.

Patent Literature 1 discloses a zoom lens that performs image blur correction by integrally rotating a plurality of lens systems, which move along loci different from one another during zooming, about a barycentric position or a position in the vicinity of the barycentric position as a center. Further, Patent Literature 2 discloses an optical image pickup system in which an optical system for image blur correction including a first lens having a negative power and a second lens having a positive power is disposed on an object side of a main lens system. During image blur correction, at least one of the first lens and the second lens rotates.

Generally, for a zoom lens having an image stabilization function, there is a demand to accurately execute image blur correction, and there is a demand to have less fluctuation in aberrations at the time of image blur correction. In order to satisfy such demands, it is important to appropriately set a lens configuration of a zoom lens, a lens configuration of an image stabilization lens system for image blur correction, and the like. Unless the lens configuration of the image stabilization lens system moving for image blur correction is appropriate, image blur correction is insufficient, and an amount of occurrence of decentering aberration increases at the time of image stabilization. As a result, it is difficult to keep optical performance excellent at the time of image stabilization.

In the photography lens having an image blur correction function of Patent Literature 1, a plurality of lens units is integrally rotated. Hence, a degree of freedom of correction in the decentering aberration, which is caused at the time of image blur correction, is restricted. Hence, it is difficult to keep optical performance favorable at the time of image blur correction.

Further, in the zoom lens of Patent Literature 2, by rotating at least one of the first lens and the second lens, image blur correction is performed. In Patent Literature 2, an image blur correction system is mounted on a front surface of a main lens system. Hence, a size of the entire optical system tends to increase.

CITATION LIST

Patent Literature

PTL 1: Japanese Patent Application Laid-Open No. 2001-249276

PTL 2: Japanese Patent Application Laid-Open No. H09-251127

SUMMARY OF INVENTION

Solution to Problem

According to an aspect of the present invention, there is provided a zoom lens including, in order from an object side to an image side: a first lens unit having a positive refractive power; a second lens unit having a negative refractive power; a third lens unit having a positive refractive power; and a rear lens group that has one or more lens units. Spacings between lens units adjacent to each other change during zooming.

The second lens unit is entirely or partially a correction lens system A that is rotatable about a center of rotation A, which is one point on an optical axis or in the vicinity of the optical axis, during image blur correction.

An optical system, which is disposed on the image side of the second lens unit, is entirely or partially a correction lens system B that is rotatable about a center of rotation B, which is one point on an optical axis or in the vicinity of the optical axis, during image blur correction.

The center of rotation A is positioned on the image side of a surface vertex of a lens surface of the correction lens system A closest to the object side. The center of rotation B is positioned on the image side of a surface vertex of a lens surface of the correction lens system B closest to the object side.

Further features of the present invention will become apparent from the following description of exemplary embodiments with reference to the attached drawings.

BRIEF DESCRIPTION OF DRAWINGS

FIG. 1 shows lens cross-sectional views (A) at a wide-angle end, (B) an intermediate zoom position, and (C) a telephoto end in Numerical Embodiment 1 of the present invention.

FIG. 3A shows lateral aberration diagrams at the wide-angle end in Numerical Embodiment 1 of the present invention.

FIG. 3B shows lateral aberration diagrams at the intermediate zoom position in Numerical Embodiment 1 of the present invention.

FIG. 3C shows lateral aberration diagrams at the telephoto end in Numerical Embodiment 1 of the present invention.

FIG. 4A shows lateral aberration diagrams at the wide-angle end at the time of image blur correction in Numerical Embodiment 1 of the present invention.

FIG. 4B shows lateral aberration diagrams at the intermediate zoom position at the time of image blur correction in Numerical Embodiment 1 of the present invention.

FIG. 4C shows lateral aberration diagrams at the telephoto end at the time of image blur correction in Numerical Embodiment 1 of the present invention.

FIG. 7A shows lateral aberration diagrams at the wide-angle end in Numerical Embodiment 2 of the present invention.

FIG. 7B shows lateral aberration diagrams at the intermediate zoom position in Numerical Embodiment 2 of the present invention.

FIG. 7C shows lateral aberration diagrams at the telephoto end in Numerical Embodiment 2 of the present invention.

FIG. 8A shows lateral aberration diagrams at the wide-angle end at the time of image blur correction in Numerical Embodiment 2 of the present invention.

FIG. 8B shows lateral aberration diagrams at the intermediate zoom position at the time of image blur correction in Numerical Embodiment 2 of the present invention.

FIG. 8C shows lateral aberration diagrams at the telephoto end at the time of image blur correction in Numerical Embodiment 2 of the present invention.

FIG. 12A shows lateral aberration diagrams at the wide-angle end at the time of image blur correction in Numerical Embodiment 3 of the present invention.

FIG. 12B shows lateral aberration diagrams at the intermediate zoom position at the time of image blur correction in Numerical Embodiment 3 of the present invention.

FIG. 12C shows lateral aberration diagrams at the telephoto end at the time of image blur correction in Numerical Embodiment 3 of the present invention.

FIG. 14A shows vertical aberration diagrams at the wide-angle end in Numerical Embodiment 4 of the present invention.

FIG. 14B shows vertical aberration diagrams at the intermediate zoom position in Numerical Embodiment 4 of the present invention.

DESCRIPTION OF EMBODIMENTS

Hereinafter, preferred embodiments of the present invention will be described with reference to the accompanying drawings. A zoom lens of the present invention is configured as follows, in order to perform image blur correction when the zoom lens is vibrated. The zoom lens includes, in order from an object side to an image side: a first lens unit having a positive refractive power; a second lens unit having a negative refractive power; a third lens unit having a positive refractive power; and a rear lens group that has one or more lens units. Spacings between lens units adjacent to each other change during zooming. The second lens unit is entirely or partially a correction lens system A (a first correction lens system) that is rotatable about a center of rotation A (a first center of rotation), which is one point on an optical axis or in the vicinity of the optical axis, during image blur correction.

An optical system, which is disposed on the image side of the second lens unit, is entirely or partially a correction lens system B (a second correction lens system) that is rotatable about a center of rotation B (a second center of rotation), which is one point on an optical axis or in the vicinity of the optical axis, during image blur correction. Here, the center of rotation A is positioned on the image side of a surface vertex of a lens surface of the correction lens system A closest to the object side. Further, the center of rotation B is positioned on the image side of a surface vertex of a lens surface of the correction lens system B closest to the object side.

In the present invention, by distinguishing image blur caused by the correction lens system A from image blur caused by the correction lens system B in accordance with the zoom position, it is possible to perform image blur correction appropriate for each zoom position. In zoom lenses of Embodiments 1 to 3, image blur correction at the wide-angle end (short focal length end) is performed by rotating the correction lens system B, and image blur correction at the telephoto end (long focal length end) is performed by rotating the correction lens system A. Further, at the intermediate zoom position between the wide-angle end and the telephoto end, image blur correction is performed by rotating the correction lens system A and the correction lens system B. Further, in the zoom lens of Embodiment 4, at the wide-angle end and the intermediate zoom position, image blur correction is performed by rotating the correction lens system A, and at the telephoto end, image blur correction is performed by rotating the correction lens system A and the correction lens system B.

Figure 2A:
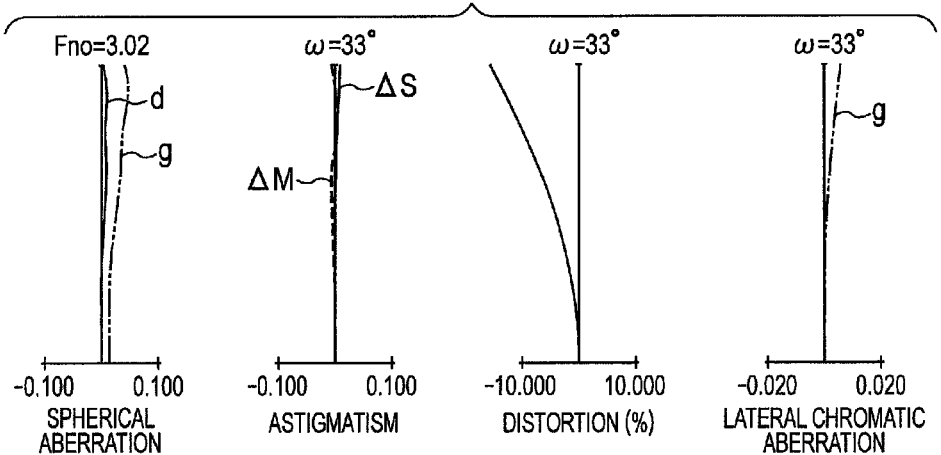
FIG. 2A shows vertical aberration diagrams at the wide-angle end in Numerical Embodiment 1 of the present invention.
Figure 2B:
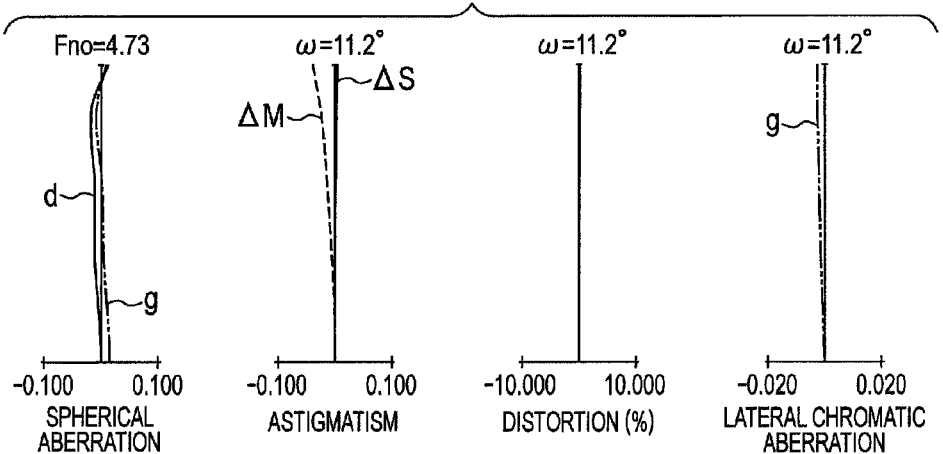
FIG. 2B shows vertical aberration diagrams at the intermediate zoom position in Numerical Embodiment 1 of the present invention.
Figure 2C:
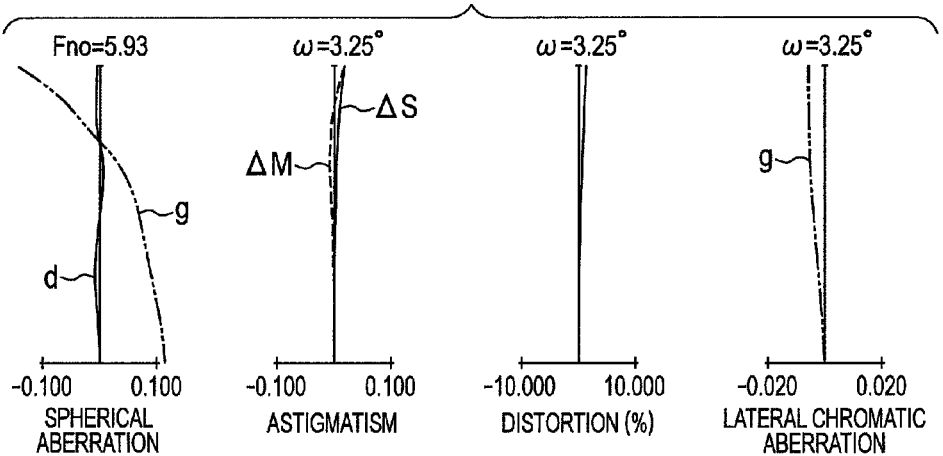
FIG. 2C shows vertical aberration diagrams at the telephoto end in Numerical Embodiment 1 of the present invention.

Lens cross-sectional views at a wide-angle end, an intermediate zoom position, and a telephoto end in Embodiment 1 of the present invention are respectively illustrated in FIGS. 1(A), (B), and (C). FIGS. 2A, 2B, and 2C are respectively vertical aberration diagrams at the wide-angle end, the intermediate zoom position, and the telephoto end of the zoom lens according to Embodiment 1. FIGS. 3A, 3B, and 3C are respectively lateral aberration diagrams at the wide-angle end, the intermediate zoom position, and the telephoto end of the zoom lens according to Embodiment 1. FIGS. 4A, 4B, and 4C are respectively lateral aberration diagrams at the wide-angle end, the intermediate zoom position, and the telephoto end at the time of image blur correction of the zoom lens according to Embodiment 1. Embodiment 1 is a zoom lens that has a zoom ratio of about 13.31 and an aperture ratio of about 3.02 to 5.93.

Lens cross-sectional views at a wide-angle end, an intermediate zoom position, and a telephoto end in Embodiment 2 of the present invention are respectively illustrated in FIGS. 5(A), (B), and (C). FIGS. 6A, 6B, and 6C are respectively vertical aberration diagrams at the wide-angle end, the intermediate zoom position, and the telephoto end of the zoom lens according to Embodiment 2. FIGS. 7A, 7B, and 7C are respectively lateral aberration diagrams at the wide-angle end, the intermediate zoom position, and the telephoto end of the zoom lens according to Embodiment 2. FIGS. 8A, 8B, and 8C are respectively lateral aberration diagrams at the wide-angle end, the intermediate zoom position, and the telephoto end at the time of image blur correction of the zoom lens according to Embodiment 2. Embodiment 2 is a zoom lens that has a zoom ratio of about 47.06 and an aperture ratio of about 3.50 to 7.07.

Figure 9:
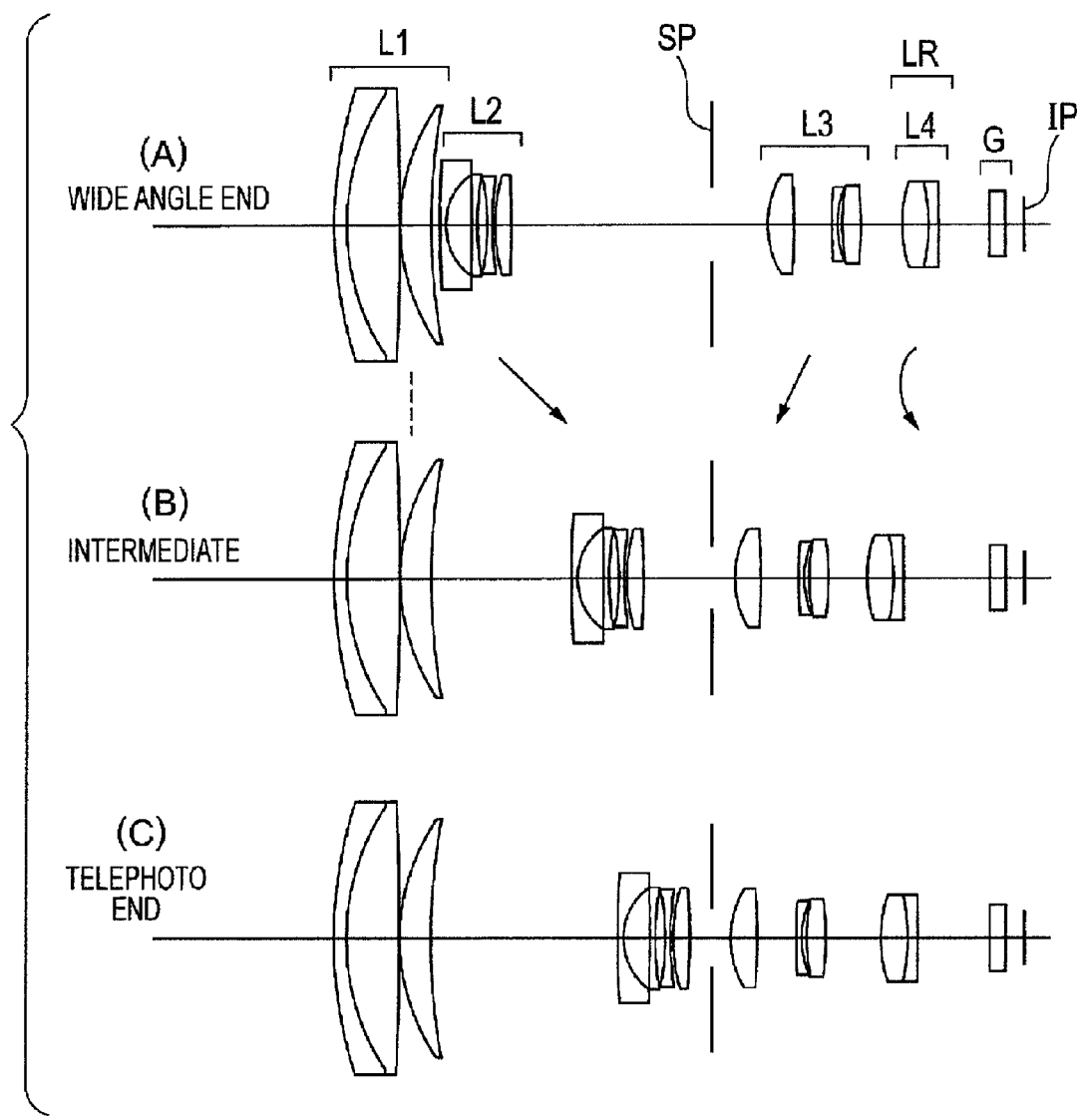
FIG. 9 shows lens cross-sectional views (A) at a wide-angle end, (B) an intermediate zoom position, and (C) a telephoto end in Numerical Embodiment 3 of the present invention.
Figure 10A:
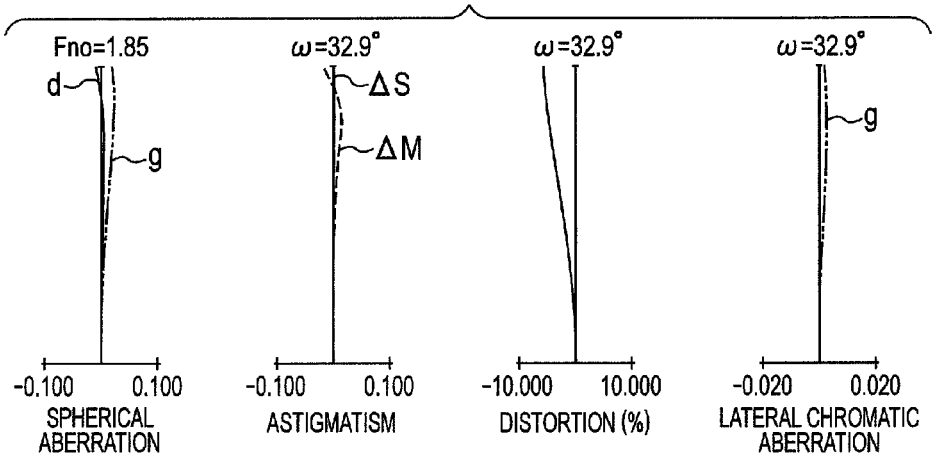
FIG. 10A shows vertical aberration diagrams at the wide-angle end in Numerical Embodiment 3 of the present invention.
Figure 10B:
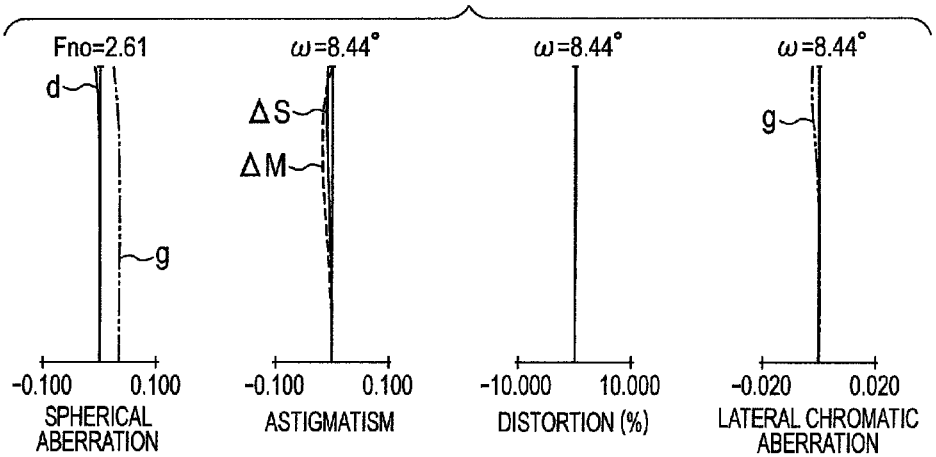
FIG. 10B shows vertical aberration diagrams at the intermediate zoom position in Numerical Embodiment 3 of the present invention.
Figure 10C:
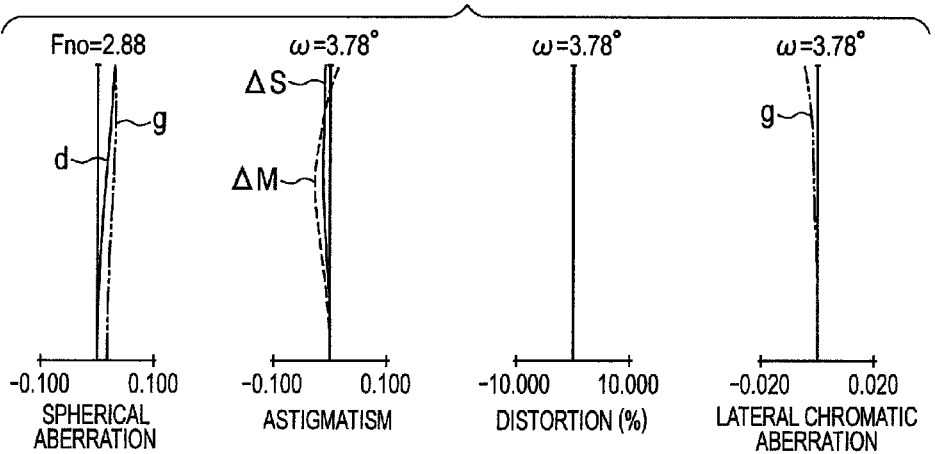
FIG. 10C shows vertical aberration diagrams at the telephoto end in Numerical Embodiment 3 of the present invention.
Figure 11A:
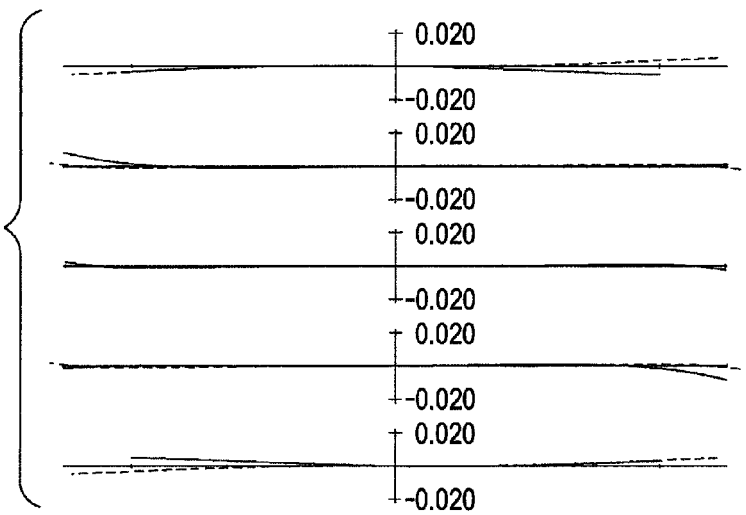
FIG. 11A shows lateral aberration diagrams at the wide-angle end in Numerical Embodiment 3 of the present invention.
Figure 11B:
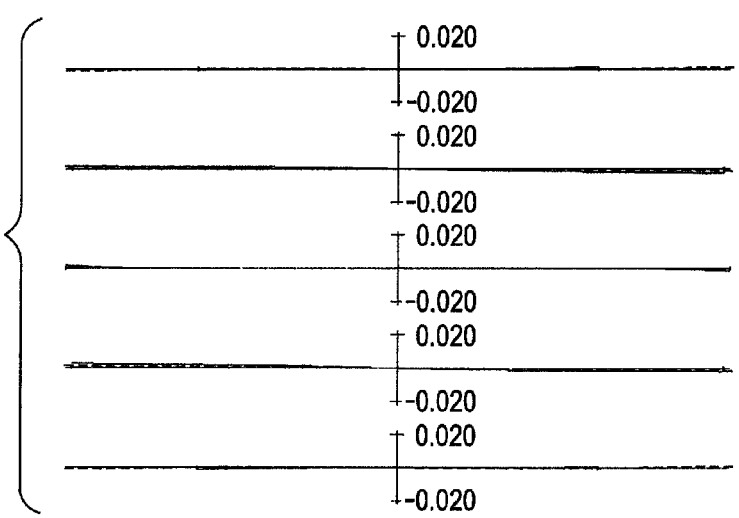
FIG. 11B shows lateral aberration diagrams at the intermediate zoom position in Numerical Embodiment 3 of the present invention.
Figure 11C:
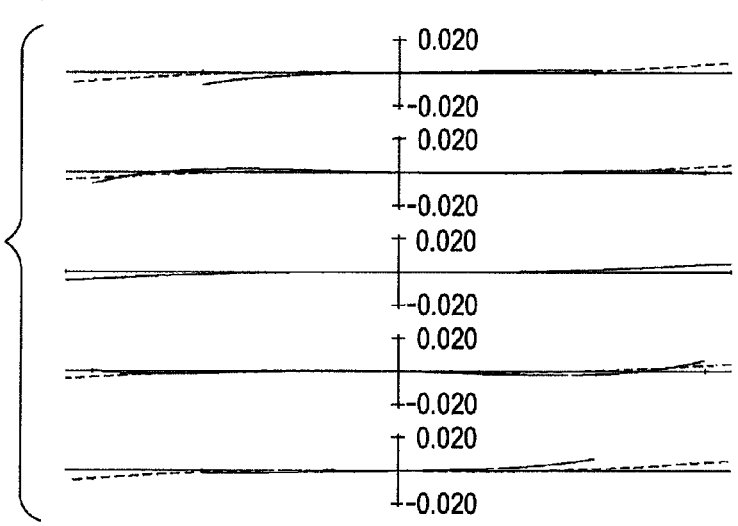
FIG. 11C shows lateral aberration diagrams at the telephoto end in Numerical Embodiment 3 of the present invention.

Lens cross-sectional views at a wide-angle end, an intermediate zoom position, and a telephoto end in Embodiment 3 of the present invention are respectively illustrated in FIGS. 9(A), (B), and (C). FIGS. 10A, 10B, and 10C are respectively vertical aberration diagrams at the wide-angle end, the intermediate zoom position, and the telephoto end of the zoom lens according to Embodiment 3. FIGS. 11A, 11B, and 11C are respectively lateral aberration diagrams at the wide-angle end, the intermediate zoom position, and the telephoto end of the zoom lens according to Embodiment 3. FIGS. 12A, 12B, and 12C are respectively lateral aberration diagrams at the wide-angle end, the intermediate zoom position, and the telephoto end at the time of image blur correction of the zoom lens according to Embodiment 3. Embodiment 3 is a zoom lens that has a zoom ratio of about 9.80 and an aperture ratio of about 1.85 to 2.88.

Figure 13:
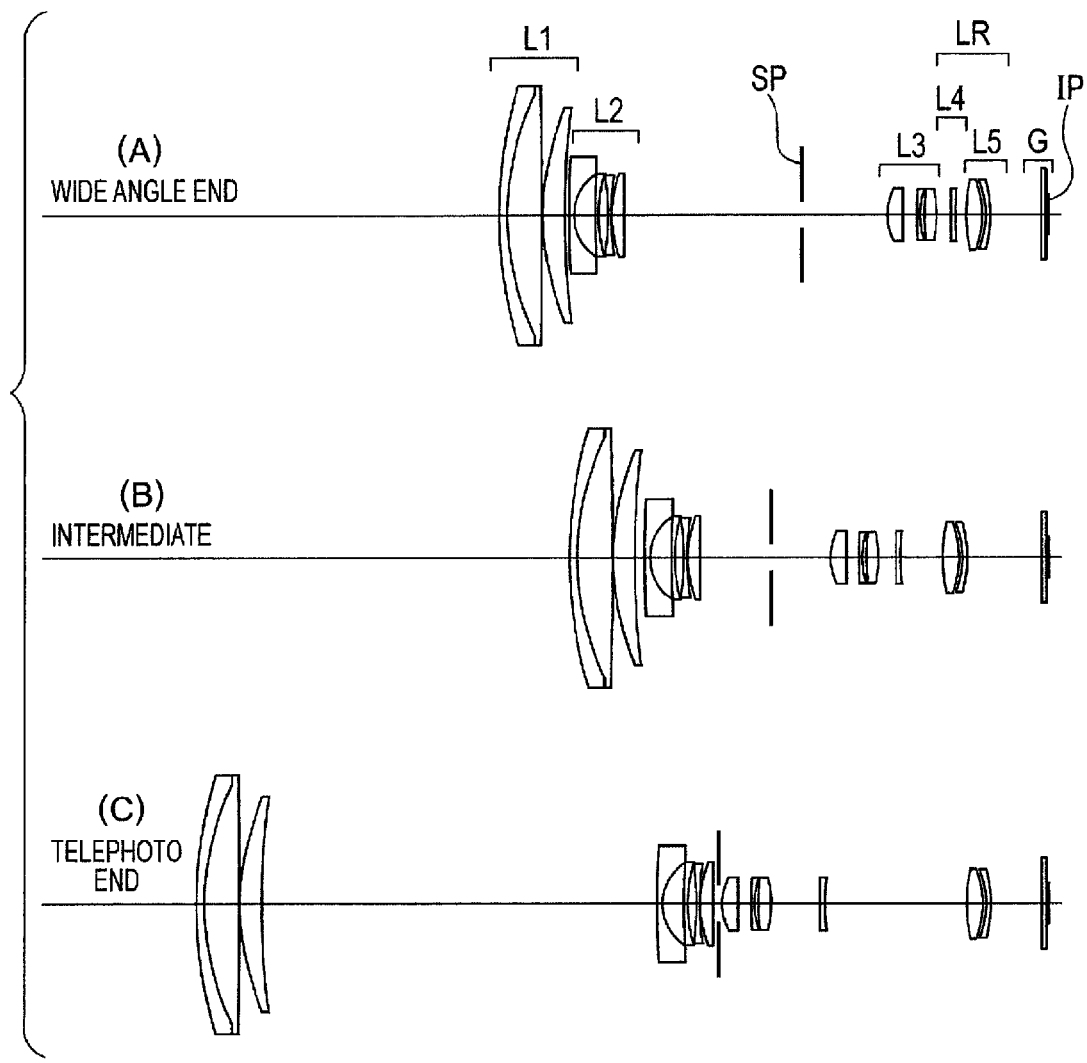
FIG. 13 shows lens cross-sectional views (A) at a wide-angle end, (B) an intermediate zoom position, and (C) a telephoto end in Numerical Embodiment 4 of the present invention.
Figure 14C:
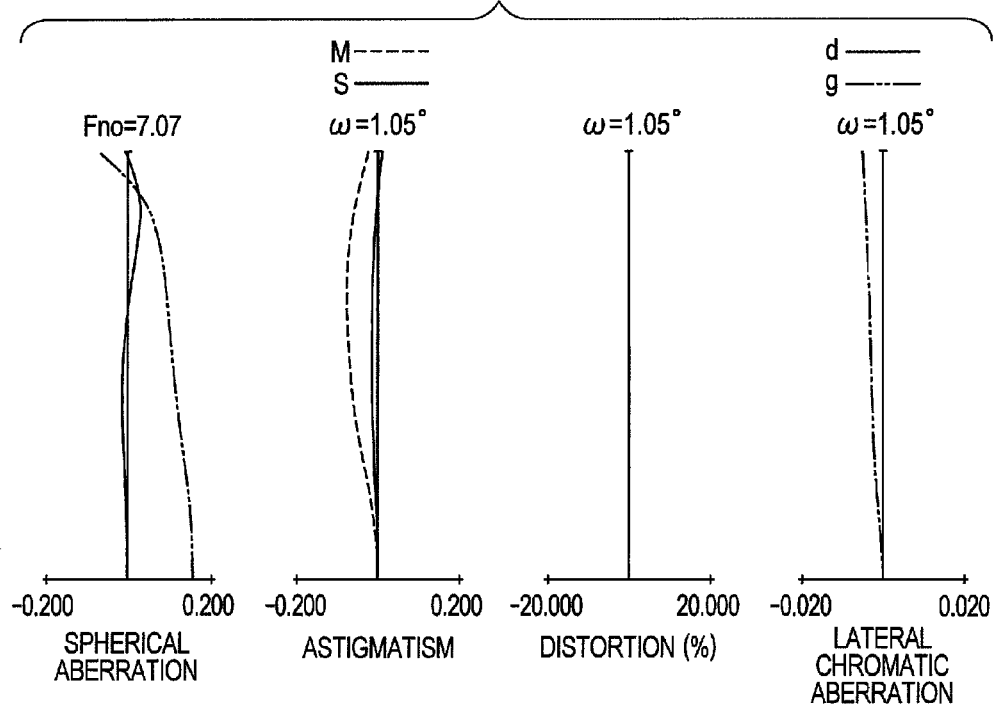
FIG. 14C shows vertical aberration diagrams at the telephoto end in Numerical Embodiment 4 of the present invention.
Figure 15A:
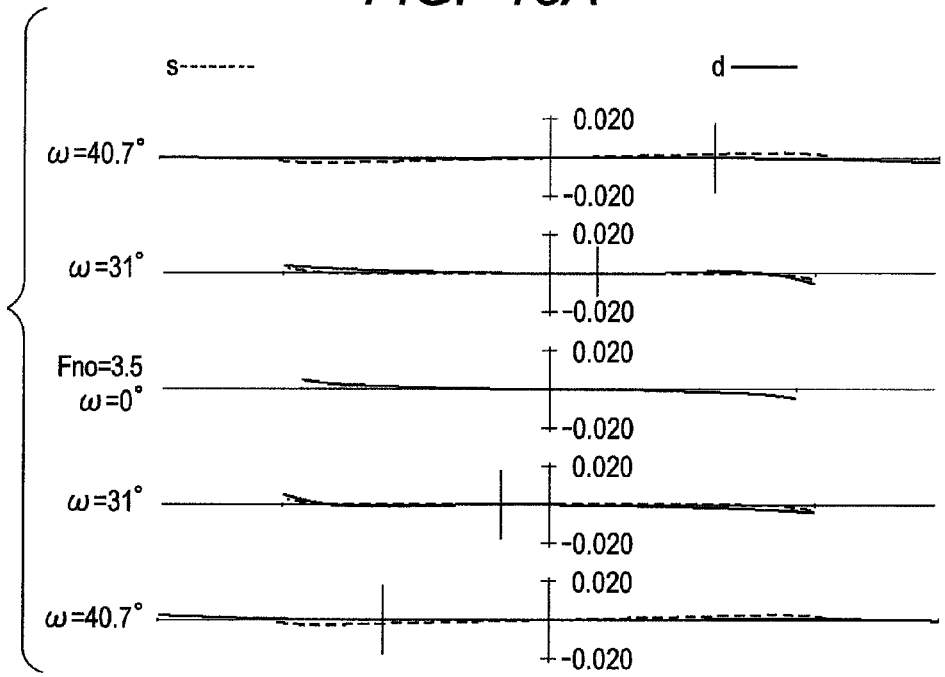
FIG. 15A shows lateral aberration diagrams at the wide-angle end in Numerical Embodiment 4 of the present invention.
Figure 15B:
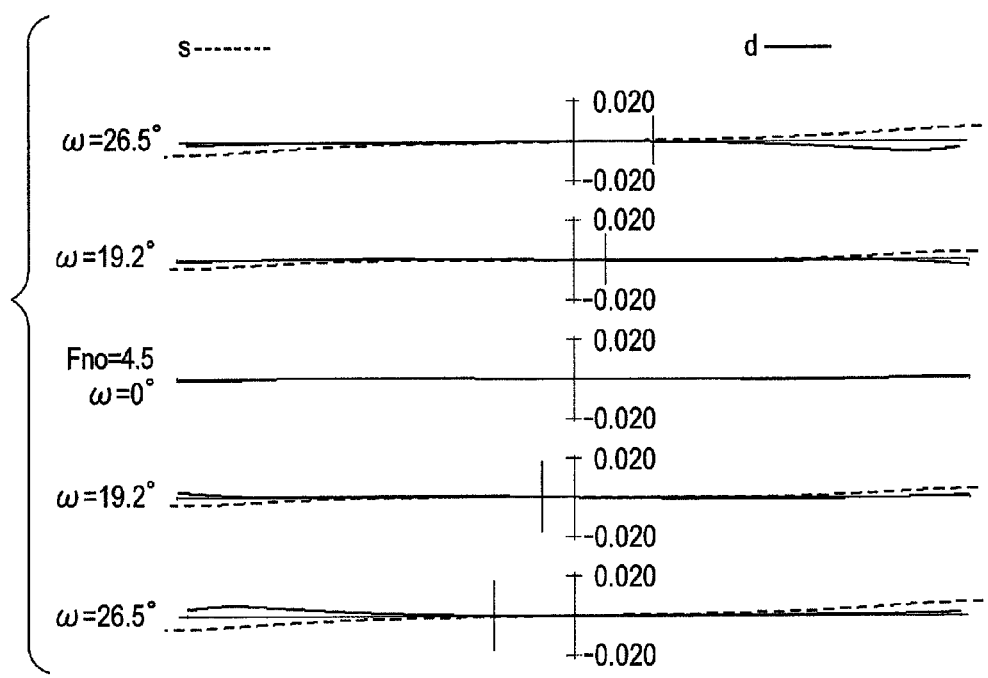
FIG. 15B shows lateral aberration diagrams at the intermediate zoom position in Numerical Embodiment 4 of the present invention.
Figure 15C:
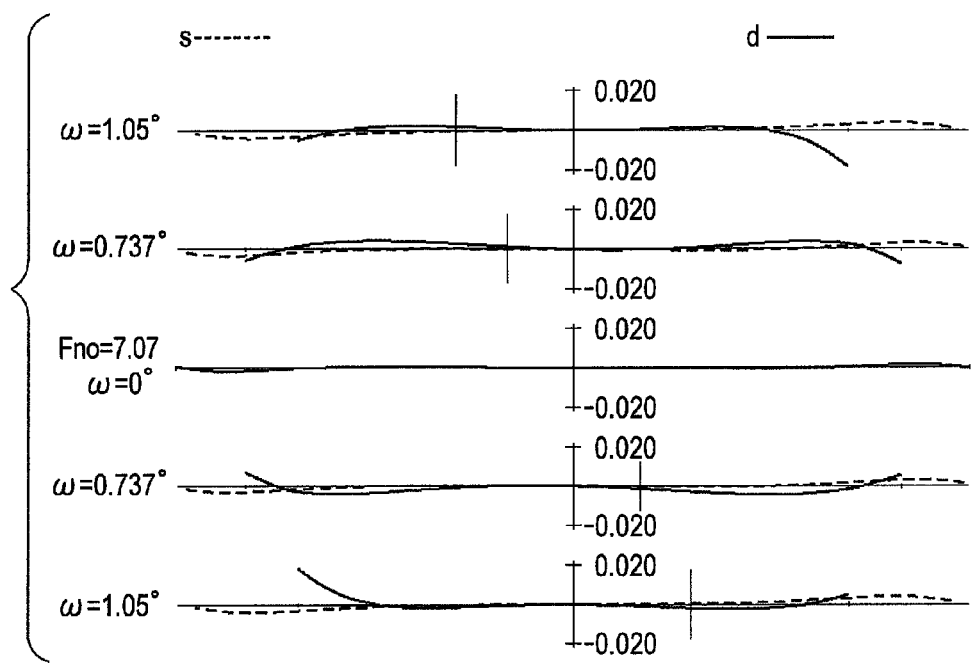
FIG. 15C shows lateral aberration diagrams at the telephoto end in Numerical Embodiment 4 of the present invention.
Figure 16A:
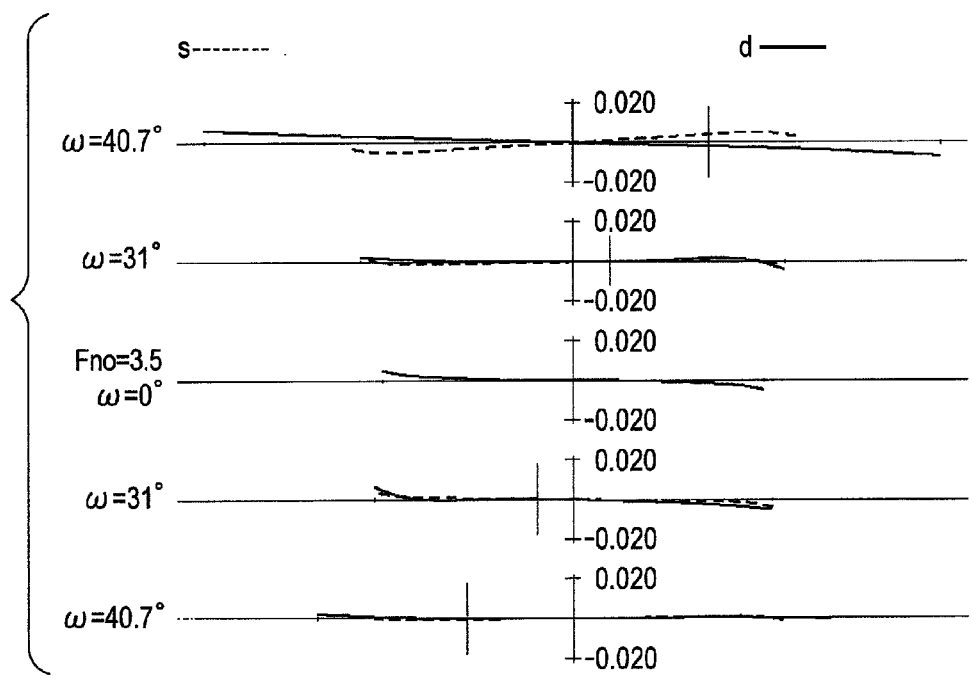
FIG. 16A shows lateral aberration diagrams at the wide-angle end at the time of image blur correction in Numerical Embodiment 4 of the present invention.
Figure 16B:
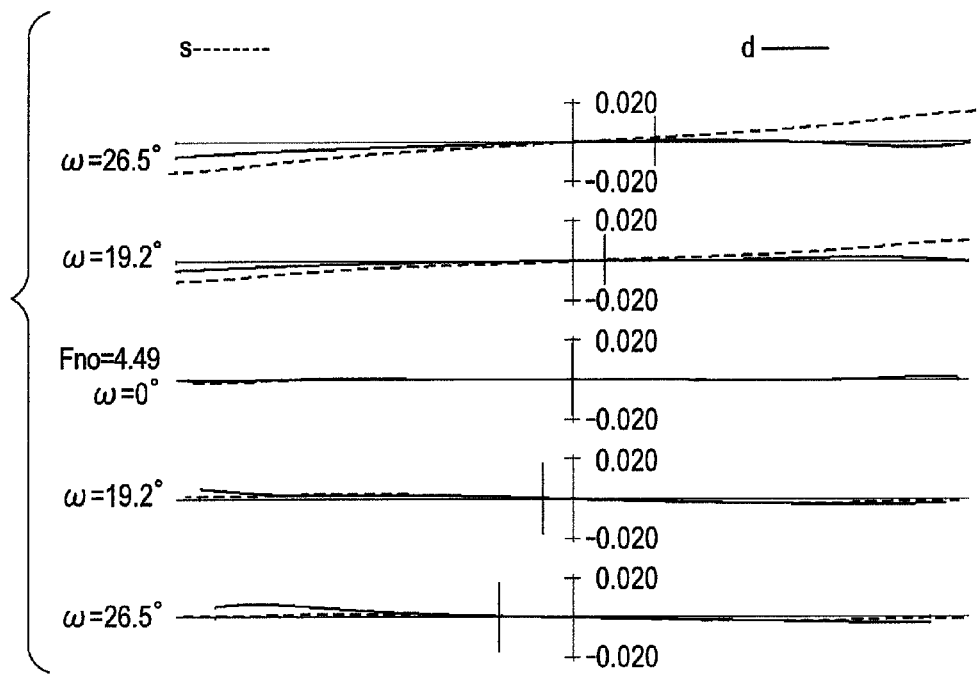
FIG. 16B shows lateral aberration diagrams at the intermediate zoom position at the time of image blur correction in Numerical Embodiment 4 of the present invention.
Figure 16C:
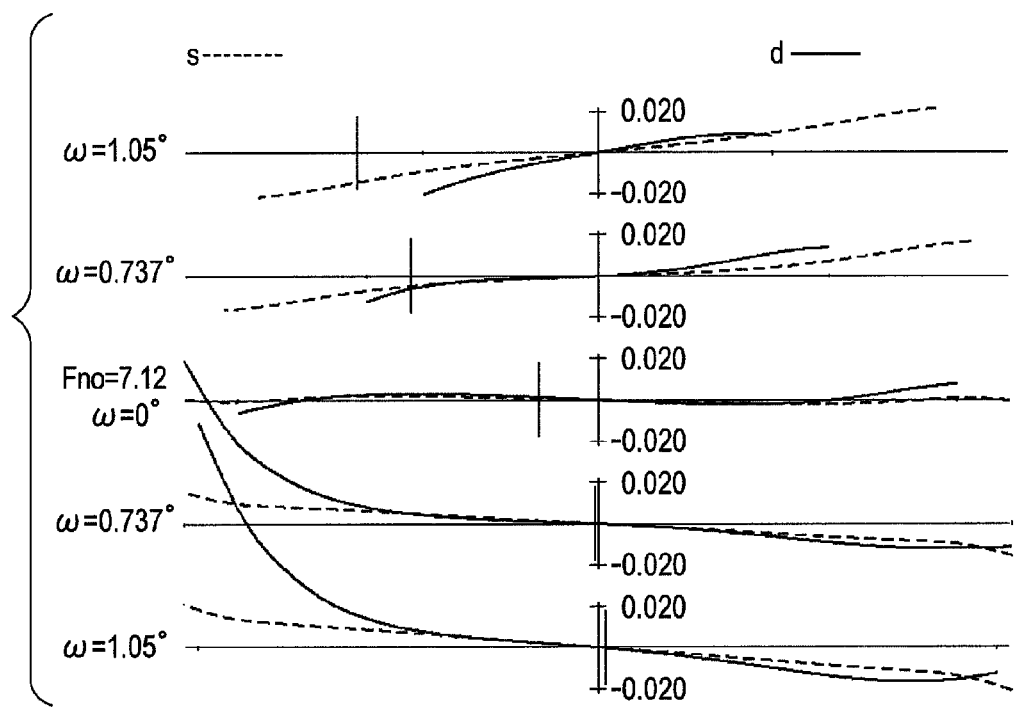
FIG. 16C shows lateral aberration diagrams at the telephoto end at the time of image blur correction in Numerical Embodiment 4 of the present invention.

Lens cross-sectional views at a wide-angle end, an intermediate zoom position, and a telephoto end in Embodiment 4 of the present invention are respectively illustrated in FIGS. 13(A), (B), and (C). FIGS. 14A, 14B, and 14C are respectively vertical aberration diagrams at the wide-angle end, the intermediate zoom position, and the telephoto end of the zoom lens according to Embodiment 4. FIGS. 15A, 15B, and 15C are respectively lateral aberration diagrams at the wide-angle end, the intermediate zoom position, and the telephoto end of the zoom lens according to Embodiment 4. FIGS. 16A, 16B, and 16C are respectively lateral aberration diagrams at the wide-angle end, the intermediate zoom position, and the telephoto end at the time of image blur correction of the zoom lens according to Embodiment 4. Embodiment 4 is a zoom lens that has a zoom ratio of about 57.03 and an aperture ratio of about 3.50 to 7.07.

Figure 17:
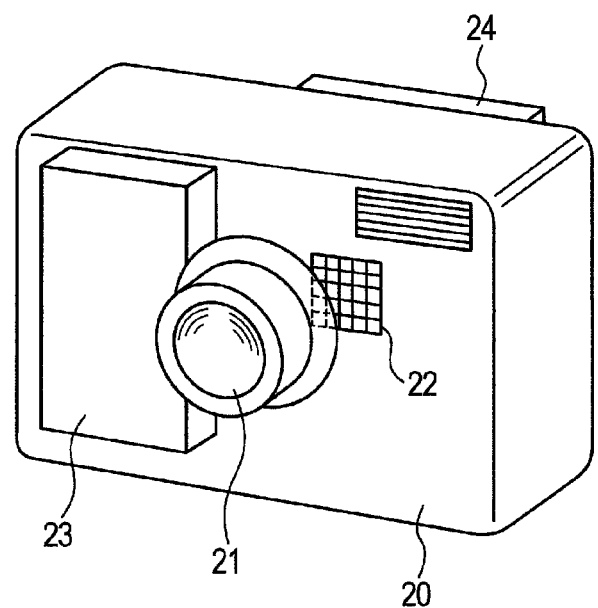
FIG. 17 is a schematic view of a main section of an image pickup apparatus according to the present invention.
Figure 18:
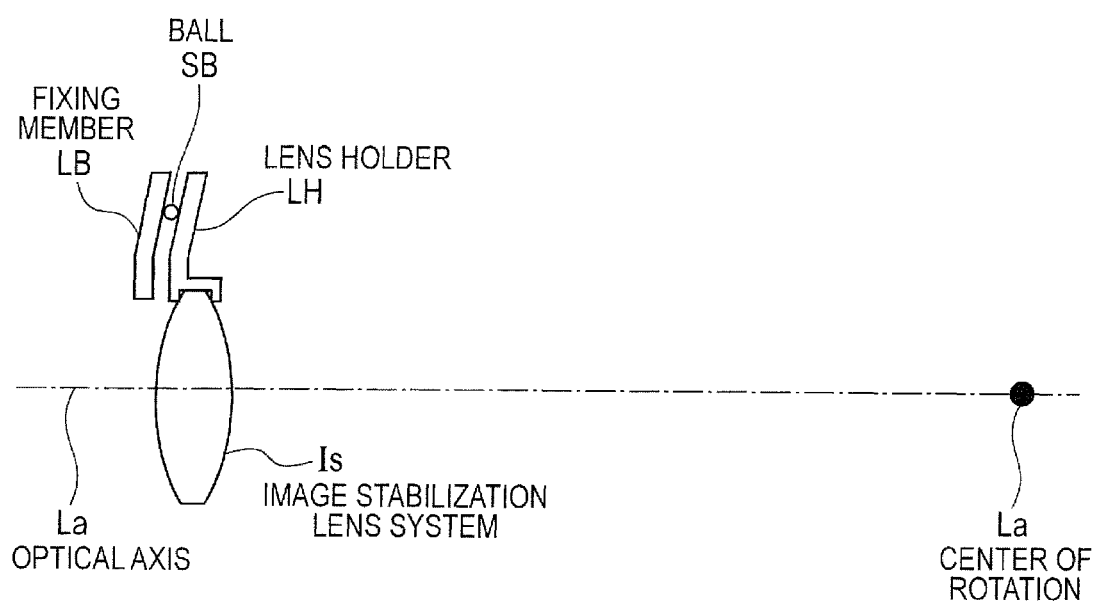
FIG. 18 is an explanatory diagram of a correction lens system at the time of image blur correction according to the present invention.

FIG. 17 is a schematic view of a main section of an image pickup apparatus according to the present invention. FIG. 18 is an explanatory diagram of a correction lens system at the time of image blur correction according to the present invention.

The zoom lens according to the present invention is used in an image pickup apparatus. In the lens cross-sectional views, the left side is the front (object side and magnification side), and the right side is the rear (image side and reduction side). In the lens cross-sectional views, i indicates an order of lens units from the object side to the image side, and Li is an i-th lens unit. LR is a rear lens group having one or more lens units. SP is an F number determining member (hereinafter referred to as an "aperture stop") that has a function of an aperture stop for adjusting (regulating) rays at an open F number (Fno).

G is an optical block corresponding to an optical filter, a phase plate, a crystalline lowpass filter, an infrared cut filter, or the like. IP is an image plane, on which an image pickup surface of an image pickup element (photoelectric conversion element) such as a CCD sensor or a CMOS sensor is set when the image pickup apparatus is used as a photography optical system of a video camera or a digital still camera. Further, a photo-sensitive surface corresponding to a film surface is set on the image plane when the image pickup apparatus is used as a photography optical system of a camera for a silver halide film.

In each vertical aberration diagram, d of spherical aberration indicates a d-line, g thereof indicates a g-line, ΔM of astigmatism indicates a meridional image plane, ΔS indicates a sagittal image plane, and g of lateral chromatic aberration indicates a g-line. In each lateral aberration diagram, in order from the upper side, aberration diagrams at the d-line at image heights of 100%, 70%, center, 70% on the opposite side, and 100% on the opposite side are illustrated. The dashed line indicates a sagittal image plane, and the solid line indicates a meridional image plane. Fno is an F number, and ω is a half angle of view (degrees). The half angle of view ω indicates a value based on a ray tracing value. In each lens cross-sectional view, the arrow indicates a locus of movement of each lens unit during zooming from the wide-angle end to the telephoto end.

In the following embodiments, the wide-angle end and the telephoto end mean zoom positions at both ends of a range in which a variable power lens unit is movable on the optical axis in a mechanism. Characteristics of the zoom lens of Embodiment 1 will be described. In the lens cross-sectional view of FIG. 1, L1 is a first lens unit having a positive refractive power, L2 is a second lens unit having a negative refractive power, L3 is a third lens unit having a positive refractive power, L4 is a fourth lens unit having a negative refractive power, and L5 is a fifth lens unit having a positive refractive power. The rear lens group LR includes the fourth lens unit L4 and the fifth lens unit L5.

In the zoom lens of Embodiment 1, the lens units move along loci different from one another during zooming. At the telephoto end relative to the wide-angle end, changes in spacings of the lens units are as follows. The spacing between the first lens unit L1 and the second lens unit L2 increases. The spacing between the second lens unit L2 and the third lens unit L3 decreases. The spacing between the third lens unit L3 and the fourth lens unit L4 increases. The spacing between the fourth lens unit L4 and the fifth lens unit L5 increases.

Further, at the telephoto end relative to the wide-angle end, all of the first lens unit L1, the second lens unit L2, the third lens unit L3, the fourth lens unit L4, and the fifth lens unit L5 are positioned on the object side. Furthermore, the second lens unit L2 moves along a locus having a shape convex toward the image side, and the fifth lens unit L5 moves along a locus having a shape convex toward the object side. As described above, by appropriately moving the lens units, it is possible to decrease the size of the zoom lens and increase the zoom ratio of the zoom lens.

An aperture stop SP is disposed in the third lens unit L3. Since the aperture stop SP is disposed at such a position, the spacing between the second lens unit L2 and the third lens unit L3 at the telephoto end decreases, and a sufficiently large amount of change in the spacing between the second lens unit L2 and the third lens unit L3 for zooming is ensured.

Further, the aperture stop SP may be disposed on the object side of the third lens unit L3. In this case, the spacing between the first lens unit L1 and the aperture stop SP can be reduced. Hence, it becomes easy to decrease an effective diameter of the front lens. Furthermore, the aperture stop SP may be disposed on the image side of the third lens unit L3. In this case, it is possible to set a long movement stroke between the second lens unit L2 and the third lens unit L3 during zooming, and thus it becomes easy to increase the zoom ratio.

The aperture stop SP moves integrally with the third lens unit L3 (along the same locus as the lens unit) during zooming. An increase in lens diameter of the third lens unit L3 is restricted through such a movement. Further, the aperture stop SP may move along a locus different (separate) from the third lens unit L3 during zooming. In this case, it becomes easy to restrict an increase in effective diameter of the front lens determined on the wide angle side.

Figure 5:
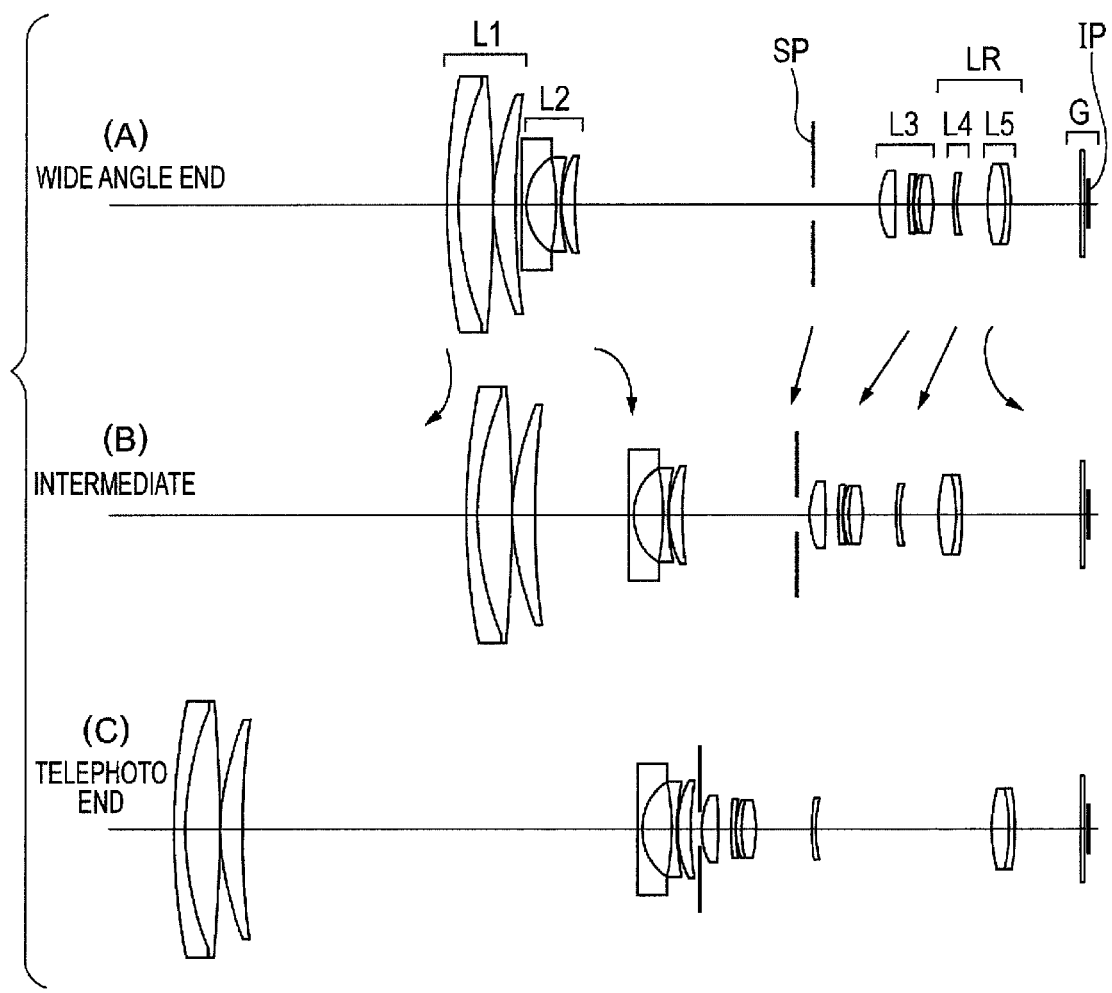
FIG. 5 shows lens cross-sectional views (A) at a wide-angle end, (B) an intermediate zoom position, and (C) a telephoto end in Numerical Embodiment 2 of the present invention.
Figure 6A:
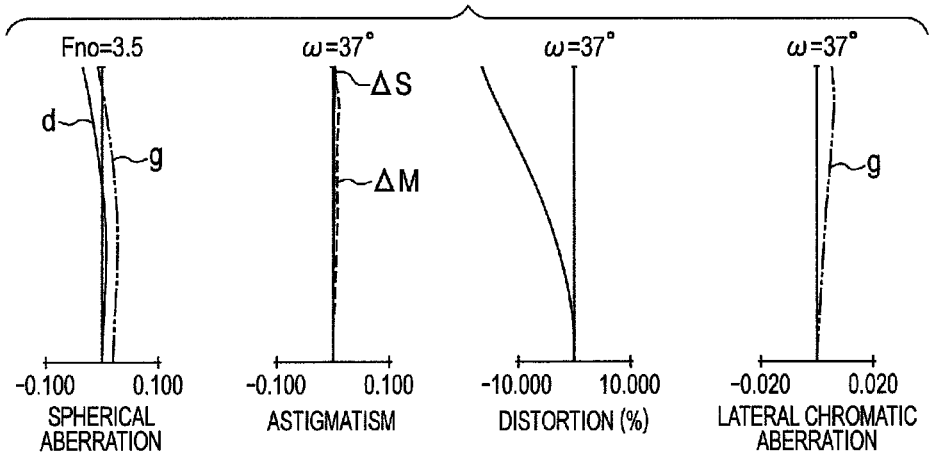
FIG. 6A shows vertical aberration diagrams at the wide-angle end in Numerical Embodiment 2 of the present invention.
Figure 6B:
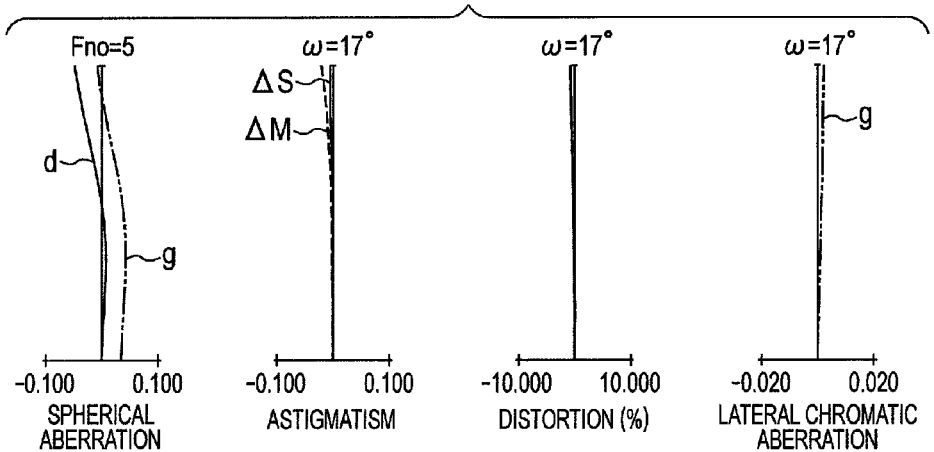
FIG. 6B shows vertical aberration diagrams at the intermediate zoom position in Numerical Embodiment 2 of the present invention.
Figure 6C:
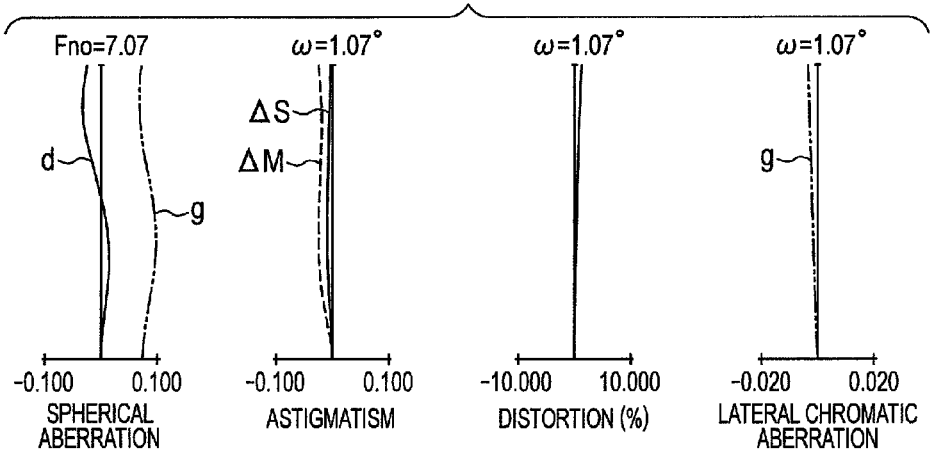
FIG. 6C shows vertical aberration diagrams at the telephoto end in Numerical Embodiment 2 of the present invention.

The number of lens units and the signs of the refractive powers of the lens units in Embodiment 2 of FIG. 5 are the same as those in Embodiment 1. During zooming, the spacings between the lens units adjacent to each other change. Specifically, at the telephoto end relative to the wide-angle end, the lens units move such that the spacing between the first lens unit L1 and the second lens unit L2 increases and the spacing between the second lens unit L2 and the third lens unit L3 decreases. Further, the lens units move such that the spacing between the third lens unit L3 and the fourth lens unit L4 increases and the spacing between the fourth lens unit L4 and the fifth lens unit L5 increases.

Furthermore, at the telephoto end relative to the wide-angle end, the first lens unit L1, the third lens unit L3, and the fourth lens unit L4 are positioned on the object side, and the second lens unit L2 and the fifth lens unit L5 are positioned on the image side. In addition, during zooming from the wide-angle end to the telephoto end, the fifth lens unit L5 moves along a locus having a shape convex toward the object side. As described above, by appropriately moving the lens units during zooming, it is possible to decrease the size of the zoom lens and increase the zoom ratio of the zoom lens. Further, the aperture stop SP may move along a locus different from the third lens unit L3 during zooming. Thereby, an increase in effective diameter of the front lens determined on the wide angle side is restricted.

Next, a zoom lens of Embodiment 3 of FIG. 9 will be described. In the lens cross-sectional view of FIG. 9, L1 is a first lens unit having a positive refractive power, L2 is a second lens unit having a negative refractive power, L3 is a third lens unit having a positive refractive power, and L4 is a fourth lens unit having a positive refractive power. The rear lens group LR is constituted by a fourth lens unit L4. In the zoom lens of Embodiment 3, the second lens unit L2, the third lens unit L3, and the fourth lens unit L4 move along different loci during zooming. At the telephoto end relative to the wide-angle end, changes in spacings of the lens units are as follows.

The spacing between the first lens unit L1 and the second lens unit L2 increases. The spacing between the second lens unit L2 and the third lens unit L3 decreases. The spacing between the third lens unit L3 and the fourth lens unit L4 increases. In the zoom lens of Embodiment 3, the first lens unit L1 and the aperture stop SP are stationary during zooming. At the telephoto end relative to the wide-angle end, the second lens unit L2 is positioned on the image side, and the third lens unit L3 is positioned on the object side. The fourth lens unit L4 moves along a locus having a shape convex toward the object side.

As described above, by appropriately moving the second to fourth lens units L2 to L4, reduction in size of the zoom lens and an increase in zoom ratio of the zoom lens are achieved.

Subsequently, a zoom lens of Embodiment 4 of FIG. 13 will be described. The zoom lens of Embodiment 4 includes a first lens unit having a positive refractive power, a second lens unit having a negative refractive power, a third lens unit having a positive refractive power, a fourth lens unit having a negative refractive power, and a fifth lens unit having a positive refractive power. The rear lens group LR is constituted by the fourth lens unit L4 and the fifth lens unit L5.

In the zoom lens of Embodiment 4, the lens units move such that the spacings between the lens units adjacent to each other change during zooming. Specifically, at the telephoto end relative to the wide-angle end, the spacing between the first lens unit L1 and the second lens unit L2 increases, and the spacing between the second lens unit L2 and the third lens unit L3 decreases. Further, the spacing between the third lens unit L3 and the fourth lens unit L4 increases and the spacing between the fourth lens unit L4 and the fifth lens unit L5 increases.

At the telephoto end relative to the wide-angle end, the second lens unit L2 and the fifth lens unit L5 are positioned on the image side, and the first lens unit L1, the third lens unit L3, and the fourth lens unit are positioned on the object side. In addition, during zooming from the wide-angle end to the telephoto end, the fifth lens unit L5 moves along a locus having a shape convex toward the object side. By appropriately moving the lens units during zooming, it is possible to decrease the size of the zoom lens and increase the zoom ratio of the zoom lens. Further, the aperture stop SP may move along a locus different from the third lens unit L3 during zooming. Thereby, it is possible to restrict an increase in effective diameter of the front lens.

In order to perform image blur correction on the image pickup surface, the zoom lens of each embodiment has a correction lens system that is rotated about a point on the optical axis or a point in the vicinity of the optical axis.

Specifically, the second lens unit L2 is entirely or partially a correction lens system A that is rotatable about a center of rotation A, which is one point on an optical axis or in the vicinity of the optical axis, during image blur correction.

Further, an optical system, which is disposed on the image side of the second lens unit L2, is entirely or partially a correction lens system B that is rotatable about a center of rotation B, which is one point on an optical axis or in the vicinity of the optical axis, during image blur correction. The center of rotation A is positioned at a finite distance on the image side of a surface vertex of a lens surface of the correction lens system A closest to the object side. The center of rotation B is positioned at a finite distance on the image side of a surface vertex of a lens surface of the correction lens system B closest to the object side.

In each zoom lens of Embodiments 1, 2, and 4 described later, the second lens unit L2 corresponds to the correction lens system A, and the third lens unit L3 corresponds to the correction lens system B. Further, in the zoom lens of Embodiment 3, the second lens unit L2 corresponds to the correction lens system A, and the third lens unit L3 and the fourth lens unit L4 correspond to the correction lens system B.

In the correction lens system A and the correction lens system B, both a shift component and a tilt component are set simultaneously by giving an angle of rotation about a point, which is at a finite distance on the optical axis, as a center of rotation. The shift component is movement in a direction perpendicular to the optical axis. The tilt component is a tilt to the optical axis. By giving the shift component, it is possible to obtain an effect of image blur correction. Further, by giving the tilt component, it is possible to obtain an effect of reducing decentering aberrations which occur when the correction lens system is decentered.

As aberrations occurring at the time of decentering, there are decentering coma, decentering astigmatism, a tilt of the image plane, and the like. Thus, it becomes easy to reduce these decentering aberrations by setting the tilt component appropriate for the shift component. The correction lens system A and the correction lens system B are rotated about one point, which is on the optical axis, as a center of rotation. At this time, it is possible to obtain an effect of reducing aberrations, which occur at the time of decentering, by setting the center of rotation on the image side of a surface vertex of a lens surface of the correction lens system closest to the object side. Further, by appropriately setting a position of the center of rotation, it is possible to effectively reduce decentering aberrations on the basis of the tilt component.

In order to prevent the effective diameter of the front lens from increasing, it is preferable that the correction lens system is formed as a lens system which is as close as possible to the object side. Regarding change in height of incidence onto the lens through which rays pass at the time of image blur correction, a change in height of incidence in a lens system closer to the object side is larger than a change in height of incidence in the correction lens system for image blur correction. Accordingly, when the correction lens system is formed as a lens system which is as close as possible to the object side, a change in height of incidence onto the front lens through which rays pass is restricted at the time of image blur correction. Thereby, a sufficient ambient luminance is easily ensured. In contrast, on a premise that a predetermined ambient luminance is ensured, it is easy to decrease the effective diameter of the front lens.

From this viewpoint, first, the first lens unit is set as the correction lens system. However, generally, in a zoom lens having a first lens unit having a positive refractive power and a second lens unit having a negative refractive power in order from the object side to the image side, an effective diameter of the first lens unit increases. Hence, a weight of the first lens unit increases, and thus it is difficult to drive the lens unit with high responsiveness in accordance with image blur correction.

Accordingly, from the viewpoints of restricting deterioration in optical performance at the time of image blur correction, ensuring the ambient luminance, decreasing the effective diameter of the front lens, reducing the weight of the correction lens system, and the like, in the zoom lens according to the present invention, the second lens unit L2 is set as the correction lens system A. Further, the correction lens system A may be a partial lens system within the second lens unit L2. Furthermore, in a zoom lens with a high zoom ratio, particularly as a focal length becomes longer in a zoom range on the telephoto side, an amount of correction driving of the correction lens system necessary for image blur correction becomes larger. As a result, the effective diameter of the front lens increases. In order to solve this problem, in the zoom lens according to the present invention, image blur correction on the telephoto side is performed mostly by the correction lens system A.

Specifically, in the zoom lens of Embodiments 1 to 3, image blur correction at the telephoto end is performed by the correction lens system A. Further, in the zoom lens of Embodiment 4, image blur correction at the telephoto end is performed by the correction lens system A and the correction lens system B.

When the center of rotation A of the correction lens system A is set to satisfactorily correct decentering aberrations at the telephoto end, it is not ensured that it is possible to satisfactorily correct decentering aberrations in other zoom ranges. Particularly, in a zoom lens of which a zoom ratio is large and a change in angle of view is large, angles of rays incident onto the first lens unit L1 and the second lens unit L2 drastically change in accordance with a zoom position. Hence, decentering aberrations, which occur when the shift component is given, are different in accordance with the zoom position.

For this problem, in the zoom lens of Embodiments 1 to 3, the center of rotation of the correction lens system B is set to satisfactorily correct decentering aberrations in the zoom ranges other than the telephoto end, and the correction lens system B is rotated, thereby performing image blur correction. The correction lens system A and the correction lens system B are appropriately separately used in accordance with the zoom range, whereby image stabilization performance in the entire zoom range is kept favorable.

In the zoom lens of Embodiment 4, at the wide-angle end or the intermediate zoom position, image blur correction is performed by the correction lens system A. On the other hand, in the zoom range on the telephoto side including the telephoto end, in addition to the correction lens system A, by rotating the correction lens system B, both the image blur correction effect and the effect of correction for decentering aberrations caused by image blurring are exerted.

Note that the correction lens systems A and the correction lens system B may be rotated to perform an image blur correction so as to improve the effect of the image blur correction in the entire zoom range.

Here, by rotating the correction lens system A and the correction lens system B along loci different from each other, it is possible to execute optimum image blur correction. At this time, the center of rotation A of the correction lens system A and the center of rotation B of the correction lens system B are at different positions.

In order to enhance the image blur correction effect, the correction lens system A rotates such that the shift component is set to be large. That is, the center of rotation A is set such that a distance from the correction lens system A to the center of rotation A is set to be long. On the other hand, in order to suppress fluctuation in aberrations caused by image blurring, the correction lens system B rotates such that the tilt component is set to be large. That is, the center of rotation B is set such that a distance from the correction lens system B to the center of rotation B is set to be relatively short.

FIG. 18 is an explanatory diagram illustrating a method of driving a correction lens system. As illustrated in FIG. 18, it is assumed that, as a configuration for rotating a correction lens system IS, a configuration, in which several balls SB are interposed between a lens holder LH and a fixing member LB adjacent thereto, is provided. The lens holder LH can be moved through rolling of the balls SB on the fixing member LB. At this time, the correction lens system IS can be rotated if a contact surface of the fixing member LB coming into contact with the balls SB is spherical. Further, the center of rotation is a center of a spherical shape of the contact surface. During zooming, the lens holder LH, the ball SB, and the fixing member LB may integrally move in a direction of the optical axis.

However, in this case, a distance from the lens holder LH to the center of rotation La may be constant regardless of zooming. With such a simple driving mechanism, it is possible to generate a shift component and a tilt component of a desired correction lens system. Further, the method of moving the correction lens system of each embodiment is not necessarily limited to rotation along the spherical shape. The shape of the contact surface may be an aspheric shape, such as a parabolic shape or an ellipsoid shape, slightly deviating from a spherical shape.

As described above, according to the present invention, it is possible to obtain a zoom lens which has a small effective diameter of the front lens and has a sufficient ambient luminance ratio and high optical performance over the entire zoom range even when the image blur correction angle at the time of image stabilization is set to be large.

In the zoom lens according to the present invention, it is preferable to satisfy at least one or more expressions of the following conditional expressions:

$$8.5 < RA/dA < 20.0 \quad (1);$$

$$0.3 < RB/dB < 10.5 \quad (2);$$

$$7.5 < |RA/fA| < 22.5 \quad (3);$$

$$0.3 < |RB/fB| < 4.5 \quad (4);$$

$$0.07 < |fA/f1| < 0.25 \quad (5);$$

$$0.19 < |fB/f1| < 0.70 \quad (6); \text{ and}$$

$$0.02 < fW/f1 < 0.35 \quad (7),$$

where RA represents a distance from the surface vertex of the lens surface of the correction lens system A close to the object side to the center of rotation A, dA represents a thickness of the correction lens system A on the optical axis, RB represents a distance from the surface vertex of the lens surface of the correction lens system B close to the object side to the center of rotation B, dB represents a thickness of the correction lens system B on the optical axis, fA represents a focal length of the correction lens system A, fB represents a focal length of the correction lens system B, f1 represents a focal length of the first lens unit L1, and fW represents a focal length of the zoom lens at the wide-angle end. Next, a technical scope of the above-mentioned conditional expressions will be described.

In the zoom lens of each embodiment, by rotating the correction lens system A, the shift component and the tilt component relative to the optical axis are given. Here, by appropriately setting the tilt component relative to the shift component, decentering aberrations are effectively reduced. A degree of an effect on decentering aberrations caused by occurrence of the tilt component depends on magnitudes of the distance RA and the thickness dA. For example, when a value of the distance RA is set to be small, the tilt component is large relative to a desired amount of image blur correction, and the value makes a great contribution to decentering aberrations. Further, when a value of the thickness dA is set to be large, an amount of change in optical path length when the tilt component is generated is large, and the value makes a great contribution to decentering aberrations.

Conditional Expression (1) defines a ratio of the distance RA from the surface vertex of the lens surface to the center of rotation A to the thickness dA of the correction lens system A on the optical axis. If the result of Conditional Expression (1) is greater than the upper limit thereof and the distance RA from the surface vertex of the lens surface to the center of rotation A is excessively long, the tilt component of the correction lens system A excessively decreases, and the effect of reducing decentering aberrations on the basis of the tilt component becomes insufficient. Thus, this situation is not preferable. Alternatively, if the result is greater than the upper limit thereof and the thickness dA of the correction lens system A on the optical axis excessively decreases, change in optical path length caused by the tilt component decreases, and the effect of reducing decentering aberrations becomes insufficient. Thus, this situation is not preferable.

In contrast, if the result of Conditional Expression (1) is less than the lower limit thereof and the distance RA from the surface vertex of the lens surface to the center of rotation A is excessively short, when the shift component necessary for desired image blur correction is intended to be obtained, the tilt component is an excessively large angle. Thereby, high-order decentering aberrations occur in the tilt component, and are not satisfactorily canceled by the shift component. Thus, this situation is not preferable. Alternatively, if the result of Conditional Expression (1) is less than the lower limit thereof and the thickness dA of the correction lens system A on the optical axis excessively increases, the change in optical path length caused by the tilt component increases, and an amount of occurrence of decentering aberrations excessively increases. Thus, this situation is not preferable.

Conditional Expression (2) defines a ratio of the distance RB from the surface vertex of the lens surface to the center of rotation B to the thickness dB of the correction lens system B on the optical axis. If the result of Conditional Expression (2) is greater than the upper limit thereof and the distance RB from the surface vertex of the lens surface to the center of rotation B is excessively long, the tilt component of the correction lens system B excessively decreases, and the effect of reducing decentering aberrations on the basis of the tilt component becomes insufficient. Thus, this situation is not preferable. Alternatively, if the result of Conditional Expression (2) is greater than the upper limit thereof and the thickness dB of the correction lens system B on the optical axis excessively decreases, change in optical path length caused by the tilt component decreases, and the effect of reducing decentering aberrations on the basis of the tilt component becomes insufficient. Thus, this situation is not preferable.

In contrast, if the result of Conditional Expression (2) is less than the lower limit thereof and the distance RB from the surface vertex of the lens surface to the center of rotation B is excessively short, when the shift component necessary for desired image blur correction is intended to be obtained, the tilt component is an excessively large angle. Thereby, high-order decentering aberrations at the tilt component occur, and are not satisfactorily canceled by the shift component. Thus, this situation is not preferable. Alternatively, if the result of Conditional Expression (2) is less than the lower limit thereof and the thickness dB of the correction lens system B on the optical axis excessively increases, the change in optical path length caused by the tilt component increases, and an amount of occurrence of decentering aberrations excessively increases. Thus, this situation is not preferable.

Conditional Expression (3) defines a ratio of the distance RA, which ranges from the surface vertex of the lens surface of the correction lens system A to the center of rotation A, to a negative focal length fA of the correction lens system A. If the result of Conditional Expression (3) is greater than the upper limit thereof and the distance RA from the surface vertex of the lens surface to the center of rotation A is excessively long, the tilt component of the correction lens system A excessively decreases, and the effect of reducing decentering aberrations on the basis of the tilt component becomes insufficient. Thus, this situation is not preferable.

Alternatively, if the result of Conditional Expression (3) is greater than the upper limit thereof and the negative focal length of the correction lens system A excessively decreases (if an absolute value of the negative focal length excessively decreases), decentering aberrations, which are caused by the shift component of the correction lens system A, become excessively large. Then, the effect of reducing decentering aberrations on the basis of the tilt component becomes insufficient. Thus, this situation is not preferable.

In contrast, if the result of Conditional Expression (3) is less than the lower limit thereof and the distance RA from the surface vertex of the lens surface to the center of rotation A is excessively short, when the shift component necessary for desired image blur correction is intended to be obtained, the tilt component is an excessively large angle. Thereby, high-order decentering aberrations at the tilt component occur, and are not satisfactorily canceled by the shift component. Thus, this situation is not preferable. Alternatively, if the result of Conditional Expression (3) is less than the lower limit thereof and the negative focal length of the correction lens system A excessively increases (if the absolute value of the negative focal length excessively increases), the amount of correction of the shift component necessary for image blur correction excessively increases, and the size of the optical system increases. Thus, this situation is not preferable.

Conditional Expression (4) defines a ratio of the distance RB, which ranges from the surface vertex of the lens surface of the correction lens system B to the center of rotation B, to a positive focal length fB of the correction lens system B. If the result of Conditional Expression (4) is greater than the upper limit thereof and the distance RB from the surface vertex of the lens surface to the center of rotation B is excessively long, the tilt component of the correction lens system B excessively decreases, and the effect of reducing decentering aberrations on the basis of the tilt component becomes insufficient. Thus, this situation is not preferable.

Alternatively, if the result of Conditional Expression (4) is greater than the upper limit thereof and the positive focal length of the correction lens system B excessively decreases, decentering aberrations caused by the shift component of the correction lens system B excessively increases, and the effect of reducing decentering aberrations on the basis of the tilt component becomes insufficient. Thus, this situation is not preferable.

In contrast, if the result of Conditional Expression (4) is less than the lower limit thereof and the distance RB from the surface vertex of the lens surface to the center of rotation B is excessively short, when the shift component necessary for desired image blur correction is intended to be obtained, the tilt component is an excessively large angle. Thereby, high-order decentering aberrations at the tilt component occur, and are not satisfactorily canceled by the shift component. Thus, this situation is not preferable. Alternatively, if the result of Conditional Expression (4) is less than the lower limit thereof and the positive focal length of the correction lens system B excessively increases, the amount of correction of the shift component necessary for image blur correction excessively increases, and the size of the optical system increases. Thus, this situation is not preferable.

Conditional Expression (5) defines a ratio of the negative focal length fA of the correction lens system A to the focal length f1 of the first lens unit L1. If Conditional Expression (5) is less than the lower limit thereof and the negative focal length of the correction lens system A excessively decreases, the amount of decentering aberrations, which are caused by the shift component at the time of image blur correction, excessively increases, and it becomes difficult to reduce decentering aberrations on the basis of the tilt component. Thus, this situation is not preferable.

In contrast, if Conditional Expression (5) is greater than the upper limit thereof and the negative focal length of the correction lens system A excessively increases, image stabilization sensitivity excessively decreases. Hence, an amount of the shift component for obtaining a desired image blur correction angle excessively increases. In this case, a driving stroke for rotation increases, and a size of the driving means increases. Thus, this situation is not preferable.

Conditional Expression (6) defines a ratio of the positive focal length fB of the correction lens system B to the focal length f1 of the first lens unit L1. If Conditional Expression (6) is less than the lower limit thereof and the positive focal length of the correction lens system B excessively decreases, the amount of decentering aberrations, which are caused by the shift component at the time of image blur correction, excessively increases, and it becomes difficult to reduce decentering aberrations on the basis of the tilt component. Thus, this situation is not preferable.

In contrast, if Conditional Expression (6) is greater than the upper limit thereof and the positive focal length of the correction lens system B excessively increases, image stabilization sensitivity excessively decreases. Hence, an amount of the shift component for obtaining a desired image blur correction angle excessively increases. In this case, a driving stroke for rotation increases, and a size of the driving means increases. Thus, this situation is not preferable.

Conditional Expression (7) defines a ratio of a focal length fW of the zoom lens at the wide-angle end to the focal length f1 of the first lens unit L1. If Conditional Expression (7) is greater than the upper limit thereof and the focal length of the zoom lens at the wide-angle end excessively increases, it becomes easy to correct aberrations at the time of image blur correction in the entire zoom range, but it becomes difficult to increase the angle of view thereof. Thus, this is not preferable. In contrast, if Conditional Expression (7) is less than the lower limit thereof and the focal length of the zoom lens at the wide-angle end excessively decreases, it becomes easy to increase the angle of view thereof, but it becomes difficult to correct aberrations at the time of image blur correction in the entire zoom range. Thus, this is not preferable. Further, it is more preferable that numerical ranges of Conditional Expressions (1) to (7) are set as follows.

$$9.0 < RA/dA < 19.0 \quad (1a)$$

$$0.5 < RB/dB < 10.0 \quad (2a)$$

$$8.0 < |RA/fA| < 21.5 \quad (3a)$$

$$0.4 < |RB/fB| < 4.3 \quad (4a)$$

$$0.08 < |fA/f1| < 0.24 \quad (5a)$$

$$0.20 < |fB/f1| < 0.68 \quad (6a)$$

$$0.03 < fW/f1 < 0.31 \quad (7a)$$

It is further more preferable that numerical ranges of Conditional Expressions (1a) to (7a) are set as follows.

$$9.5 < RA/dA < 17.5 \quad (1b)$$

$$0.7 < RB/dB < 9.5 \quad (2b)$$

$$8.5 < |RA/fA| < 20.5 \quad (3b)$$

$$0.5 < |RB/fB| < 4.1 \quad (4b)$$

$$0.09 < |fA/f1| < 0.23 \quad (5b)$$

$$0.21 < |fB/f1| < 0.66 \quad (6b)$$

$$0.04 < fW/f1 < 0.29 \quad (7b)$$

In the zoom lens of each embodiment, it is preferable that the entirety of the second lens unit L2 is used as the correction lens system A. When a part of the second lens unit L2 is used as the correction lens system A, it is possible to keep optical performance favorable at the time of image blur correction. However, it is necessary to control the second lens unit L2 separately from the plurality of lens systems.

Further, in the zoom lens of each embodiment, it is preferable that the entirety of the third lens unit L3 is used as the correction lens system B. When a part of the third lens unit L3 is used as the correction lens system B, it is possible to keep optical performance favorable at the time of image blur correction. However, it is necessary to control the third lens unit L3 separately from the plurality of lens systems.

Furthermore, in the zoom lens of each embodiment, it is preferable that the third lens unit L3 is formed to have a positive refractive power. In a zoom lens having a first lens unit having a positive refractive power and a second lens unit having a negative refractive power in order from the object side to the image side, the third lens unit L3 is formed to have a negative refractive power. For example, a configuration of four lens units having positive, negative, negative, and positive refractive powers is known.

However, when the third lens unit L3 is formed to have a negative refractive power, for aberration correction, a lens surface of the third lens unit L3 closest to the object side tends to be concave. Hence, when the entirety or a part of the second lens unit L2 is rotated about one point, which is on the optical axis on the image side, as a center of rotation, the second lens unit L2 tends to interfere with the third lens unit L3. Accordingly, it becomes difficult to decrease the spacing between the second lens unit L2 and the third lens unit L3, and it becomes difficult to decrease the size of the optical system or increase the zoom ratio.

Next, an embodiment of a digital camera (image pickup apparatus) using the zoom lens according to the present invention as a photography optical system will be described with reference to FIG. 17.

In FIG. 17, the reference numeral 20 indicates a digital camera main body, the reference numeral 21 indicates a photography optical system that includes the above-mentioned zoom lens of each embodiment, the reference numeral 22 indicates an image pickup element such as a CCD that receives a subject image through the photography optical system 21, and the reference numeral 23 indicates recording means for recording a subject image which is received by the image pickup element 22. The reference numeral 24 indicates a finder for viewing a subject image displayed on the display element which is not illustrated in the drawing. The display element includes a liquid crystal panel and the like, and displays a subject image which is formed on the image pickup element 22. As described above, by applying the zoom lens according to the present invention to an image pickup apparatus such as a digital camera, it is possible to provide an image pickup apparatus having a small size and high optical performance.

Further, the zoom lens according to the present invention can be applied to a mirrorless single-lens reflex camera in a similar manner.

Next, numerical embodiments of the present invention will be described. In each numerical embodiment, i indicates an order of surfaces from the object side. In numerical embodiments, ri indicates a radius of curvature of the i-th lens surface in order from the object side. di indicates an air gap and a thickness of the i-th lens in order from the object side. ndi and vdi respectively indicate a refractive index and an Abbe number of glass, which is a material of the i-th lens in order from the object side, at the d-line. When the optical axis direction is an X axis, a direction perpendicular to the optical axis is an H axis, and a direction in which light travels is a positive direction, it is assumed that r is a paraxial radius of curvature, K is a conic constant, and A4, A6, A8, and A10 are respectively aspheric surface coefficients. Under this assumption, an aspheric surface shape is represented by the following expression.

$$X = \frac{(1/R)H^2}{1+\sqrt{1-(1+K)(H/R)^2}} + \quad [\text{Math. 1}]$$

$$A4 \times H^4 + A6 \times H^6 + A8 \times H^8 + A10 \times H^{10}$$

Further, [e+X] means [×10$^{+X}$], and [e−X] means [×10$^{-X}$]. BF is a back focal length, into which a distance from a final lens surface to a paraxial image plane is air-converted. The total lens length is the sum of the back focal length BF and a distance from the first lens surface to the final lens surface. The aspheric surface is indicated by * which is added after the surface number. Relationships between the above-mentioned conditional expressions and numerical embodiments are shown in Table 1.

In the lens system position data at the time of image blur correction, the position of the center of rotation indicates a distance from the vertex of the lens surface of the correction lens system closest to the object side to the center of rotation, where the plus sign indicates the image side as viewed from the correction lens system. The tilt angle indicates an angle of rotation at the time of image blur correction, where the plus sign indicates a counterclockwise direction in the lens cross-sectional view of each embodiment. Further, the image blur correction angle indicates an angle for correction of a screen center.

Numerical Embodiment 1

| UNIT mm | | | | |
|---|---|---|---|---|
| SURFACE DATA | | | | |
| SURFACE NUMBER i | ri | di | ndi | vdi |
| 1 | 47.542 | 0.90 | 1.84666 | 23.9 |
| 2 | 28.475 | 2.74 | 1.49700 | 81.5 |
| 3 | 2493.581 | 0.20 | | |
| 4 | 26.865 | 2.17 | 1.69680 | 55.5 |
| 5 | 136.341 | (VARIABLE) | | |
| 6 | 2436.982 | 1.03 | 1.85135 | 40.1 |
| 7* | 5.904 | 2.56 | | |
| 8 | −12.706 | 0.60 | 1.80400 | 46.6 |
| 9 | 37.693 | 0.20 | | |
| 10 | 14.605 | 1.37 | 1.94595 | 18.0 |
| 11 | −215.216 | (VARIABLE) | | |
| 12* | 7.944 | 1.38 | 1.58313 | 59.4 |
| 13* | −59.910 | 0.86 | | |
| 14 (STOP) | ∞ | 1.39 | | |
| 15 | 10.467 | 0.60 | 1.94595 | 18.0 |
| 16 | 6.384 | 0.53 | | |
| 17 | 19.590 | 1.37 | 1.60311 | 60.6 |
| 18 | −18.355 | (VARIABLE) | | |
| 19 | 452.291 | 0.50 | 1.48749 | 70.2 |
| 20 | 31.753 | (VARIABLE) | | |
| 21 | 16.612 | 1.44 | 1.69680 | 55.5 |
| 22 | 153.432 | 0.60 | 1.72825 | 28.5 |
| 23 | 51.937 | (VARIABLE) | | |
| 24 | ∞ | 0.80 | 1.51633 | 64.1 |
| 25 | ∞ | 0.88 | | |
| IMAGE PLANE | ∞ | | | |

| ASPHERIC SURFACE DATA |
|---|
| SEVENTH SURFACE |

K = −2.35333e+000   A4 = 1.49919e−003   A6 = −2.81439e−006
A8 = 3.23263e−007   A10 = 1.76871e−008

TWELFTH SURFACE

K = 1.29966e+000   A4 = −1.03059e−003   A6 = −8.43554e−005
A8 = 5.54525e−006   A10 = −7.59601e−007

THIRTEENTH SURFACE

K = 2.12676e+002   A4 = −3.61241e−004   A6 = −6.62061e−005
A8 = 4.12821e−006   A10 = −5.75474e−007

| VARIOUS KINDS OF DATA | | | |
|---|---|---|---|
| ZOOM RATIO 13.31 | | | |
| | WIDE ANGLE | INTERMEDIATE | TELEPHOTO |
| FOCAL LENGTH | 5.13 | 19.59 | 68.25 |
| F NUMBER | 3.02 | 4.73 | 5.93 |
| HALF ANGLE OF VIEW (DEGREES) | 33.03 | 11.19 | 3.25 |
| IMAGE HEIGHT | 3.33 | 3.88 | 3.88 |
| TOTAL LENS LENGTH | 49.53 | 56.32 | 75.76 |
| BF | 7.94 | 18.26 | 8.34 |
| d5 | 0.94 | 10.25 | 22.87 |
| d11 | 15.81 | 3.51 | 0.71 |
| d18 | 1.90 | 2.78 | 2.98 |

-continued

| UNIT mm | | | |
|---|---|---|---|
| d20 | 2.50 | 1.09 | 20.42 |
| d23 | 6.53 | 16.85 | 6.93 |

| ZOOM LENS UNIT DATA | | |
|---|---|---|
| UNIT | FIRST SURFACE | FOCAL LENGTH |
| 1 | 1 | 38.39 |
| 2 | 6 | −6.36 |
| 3 | 12 | 11.44 |
| 4 | 19 | −70.08 |
| 5 | 21 | 34.69 |

| CORRECTION LENS SYSTEM DATA FOR BLUR CORRECTION | | |
|---|---|---|
| CORRECTION LENS SYSTEM A | FIRST SURFACE NUMBER 6 | FINAL SURFACE NUMBER 11 |
| CORRECTION LENS SYSTEM FOCAL LENGTH fA | −6.363 mm | |
| CORRECTION LENS SYSTEM THICKNESS dA | 5.756 mm | |
| CORRECTION LENS SYSTEM CENTER OF ROTATION POSITION RA | 60.154 mm | |

| | FIRST SURFACE | FINAL SURFACE |
|---|---|---|
| CORRECTION LENS SYSTEM B | NUMBER 12 | NUMBER 18 |
| CORRECTION LENS SYSTEM FOCAL LENGTH fB | 11.443 mm | |
| CORRECTION LENS SYSTEM THICKNESS dB | 6.128 mm | |
| CORRECTION LENS SYSTEM CENTER OF ROTATION POSITION RB | 6.500 mm | |

| | WIDE ANGLE | INTERMEDIATE | TELEPHOTO |
|---|---|---|---|
| CORRECTION LENS SYSTEM | CORRECTION LENS SYSTEM B | CORRECTION LENS SYSTEM B | CORRECTION LENS SYSTEM A |
| CORRECTION LENS SYSTEM TILT ANGLE | 2.09 DEGREES | 5.02 DEGREES | −1.00 DEGREES |
| BLUR CORRECTION ANGLE | −3.0 DEGREES | −3.0 DEGREES | −3.0 DEGREES |

Numerical Embodiment 2

| UNIT mm | | | | |
|---|---|---|---|---|
| SURFACE DATA | | | | |
| SURFACE NUMBER i | ri | di | ndi | vdi |
| 1 | 91.809 | 1.80 | 1.91082 | 35.3 |
| 2 | 49.682 | 5.14 | 1.49700 | 81.5 |
| 3 | −172.691 | 0.18 | | |
| 4 | 40.799 | 3.19 | 1.49700 | 81.5 |
| 5 | 125.399 | (VARIABLE) | | |
| 6 | 264.824 | 0.95 | 1.88300 | 40.8 |
| 7 | 8.654 | 4.75 | | |
| 8 | −34.290 | 0.70 | 1.77250 | 49.6 |
| 9 | 29.514 | 0.20 | | |
| 10 | 17.261 | 2.03 | 1.95906 | 17.5 |
| 11 | 68.338 | (VARIABLE) | | |
| 12 (STOP) | ∞ | (VARIABLE) | | |
| 13* | 10.682 | 2.55 | 1.55332 | 71.7 |

-continued

UNIT mm

| | | | | |
|---|---|---|---|---|
| 14* | −1301.722 | 1.88 | | |
| 15 | 25.419 | 0.60 | 1.77250 | 49.6 |
| 16 | 11.168 | 0.32 | | |
| 17 | 15.838 | 0.60 | 2.00330 | 28.3 |
| 18 | 11.699 | 2.19 | 1.49700 | 81.5 |
| 19 | −26.225 | (VARIABLE) | | |
| 20 | 27.270 | 0.70 | 1.91082 | 35.3 |
| 21 | 16.857 | (VARIABLE) | | |
| 22 | 22.140 | 2.70 | 1.77250 | 49.6 |
| 23 | −20.954 | 0.60 | 1.91082 | 35.3 |
| 24 | −323.774 | (VARIABLE) | | |
| 25 | ∞ | 0.50 | 1.51633 | 64.1 |
| 26 | ∞ | 0.50 | | |
| IMAGE PLANE | ∞ | | | |

ASPHERIC SURFACE DATA

THIRTEENTH SURFACE

K = −1.00530e+000   A4 = 1.06429e−005   A6 = 3.26152e−007
A8 = 9.58317e−009   A10 = 2.62605e−010

FOURTEENTH SURFACE

K = −5.46043e+005   A4 = −1.36233e−005   A6 = 1.09625e−006

VARIOUS KINDS OF DATA
ZOOM RATIO 47.06

| | WIDE ANGLE | INTERMEDIATE | TELEPHOTO |
|---|---|---|---|
| FOCAL LENGTH | 4.42 | 12.67 | 208.00 |
| F NUMBER | 3.50 | 5.00 | 7.07 |
| HALF ANGLE OF VIEW (DEGREES) | 37.01 | 17.00 | 1.07 |
| IMAGE HEIGHT | 3.33 | 3.88 | 3.88 |
| TOTAL LENS LENGTH | 97.10 | 94.01 | 138.81 |
| BF | 11.63 | 19.04 | 11.10 |
| d5 | 0.78 | 14.02 | 60.14 |
| d11 | 35.95 | 17.16 | 1.31 |
| d12 | 9.99 | 1.81 | 0.09 |
| d19 | 2.98 | 4.99 | 8.58 |
| d21 | 4.69 | 5.91 | 26.52 |
| d24 | 10.80 | 18.21 | 10.27 |

ZOOM LENS UNIT DATA

| UNIT | FIRST SURFACE | FOCAL LENGTH |
|---|---|---|
| 1 | 1 | 78.55 |
| 2 | 6 | −9.25 |
| 3 | 13 | 19.11 |
| 4 | 20 | −50.07 |
| 5 | 22 | 31.97 |

CORRECTION LENS SYSTEM DATA FOR BLUR CORRECTION

| CORRECTION LENS SYSTEM A | FIRST SURFACE NUMBER 6 | FINAL SURFACE NUMBER 11 |
|---|---|---|
| CORRECTION LENS SYSTEM FOCAL LENGTH fA | −9.254 mm | |
| CORRECTION LENS SYSTEM THICKNESS dA | 8.633 mm | |
| CORRECTION LENS SYSTEM CENTER OF ROTATION POSITION RA | 119.000 mm | |

| CORRECTION LENS SYSTEM B | FIRST SURFACE NUMBER 13 | FINAL SURFACE NUMBER 19 |
|---|---|---|
| CORRECTION LENS SYSTEM FOCAL LENGTH fB | 19.109 mm | |
| CORRECTION LENS SYSTEM THICKNESS dB | 8.144 mm | |
| CORRECTION LENS SYSTEM CENTER OF ROTATION POSITION RB | 70.000 mm | |

| | WIDE ANGLE | INTERMEDIATE | TELEPHOTO |
|---|---|---|---|
| CORRECTION LENS SYSTEM | CORRECTION LENS SYSTEM B | CORRECTION LENS SYSTEM B | CORRECTION LENS SYSTEM A |
| CORRECTION LENS SYSTEM TILT ANGLE | 0.21 DEGREES | 0.45 DEGREES | −0.32 DEGREES |
| BLUR CORRECTION ANGLE | −4.0 DEGREES | −4.0 DEGREES | −0.7 DEGREES |

Numerical Embodiment 3

UNIT mm

SURFACE DATA

| SURFACE NUMBER i | ri | di | ndi | vdi |
|---|---|---|---|---|
| 1 | 53.041 | 1.35 | 1.84666 | 23.9 |
| 2 | 27.668 | 6.05 | 1.60311 | 60.6 |
| 3 | −440.882 | 0.18 | | |
| 4 | 24.922 | 3.45 | 1.69680 | 55.5 |
| 5 | 74.134 | (VARIABLE) | | |
| 6 | 147.266 | 0.70 | 1.88300 | 40.8 |
| 7 | 7.285 | 2.97 | | |
| 8 | −111.952 | 0.60 | 1.80610 | 33.3 |
| 9 | 29.523 | 1.22 | | |
| 10 | −25.404 | 0.60 | 1.80400 | 46.6 |
| 11 | 40.496 | 0.27 | | |
| 12 | 20.278 | 1.94 | 1.92286 | 18.9 |
| 13 | −54.086 | (VARIABLE) | | |
| 14 (STOP) | ∞ | (VARIABLE) | | |
| 15* | 10.402 | 3.01 | 1.58313 | 59.4 |
| 16 | −129.903 | 4.39 | | |
| 17 | 56.301 | 0.60 | 1.80518 | 25.4 |
| 18 | 10.489 | 0.59 | | |
| 19* | 21.401 | 2.23 | 1.58313 | 59.4 |
| 20 | −36.073 | (VARIABLE) | | |
| 21 | 13.790 | 3.07 | 1.69680 | 55.5 |
| 22 | −22.255 | 1.10 | 1.84666 | 23.9 |
| 23 | −236.089 | (VARIABLE) | | |
| 24 | ∞ | 1.94 | 1.51633 | 64.1 |
| 25 | ∞ | 1.98 | | |
| IMAGE PLANE | ∞ | | | |

ASPHERIC SURFACE DATA

FIFTEENTH SURFACE

K = −8.66524e−001   A4 = −1.99723e−006   A6 = 7.05266e−008
A8 = 6.79053e−010

NINETEENTH SURFACE

K = −4.10770e−001   A4 = −2.43478e−005   A6 = 1.73933e−008
A8 = −1.14367e−011

VARIOUS KINDS OF DATA
ZOOM RATIO 9.80

| | WIDE ANGLE | INTERMEDIATE | TELEPHOTO |
|---|---|---|---|
| FOCAL LENGTH | 4.63 | 20.22 | 45.44 |
| F NUMBER | 1.85 | 2.61 | 2.88 |

-continued

| UNIT mm | | | |
|---|---|---|---|
| HALF ANGLE OF VIEW (DEGREES) | 32.92 | 8.44 | 3.78 |
| IMAGE HEIGHT | 3.00 | 3.00 | 3.00 |
| TOTAL LENS LENGTH | 78.39 | 78.39 | 78.39 |
| BF | 9.14 | 13.15 | 11.55 |
| d5 | 1.01 | 16.10 | 21.46 |
| d13 | 22.93 | 7.84 | 2.48 |
| d14 | 6.40 | 2.56 | 2.25 |
| d20 | 4.59 | 4.42 | 6.33 |
| d23 | 5.88 | 9.89 | 8.29 |

ZOOM LENS UNIT DATA

| UNIT | FIRST SURFACE | FOCAL LENGTH |
|---|---|---|
| 1 | 1 | 36.96 |
| 2 | 6 | −7.42 |
| 3 | 15 | 21.10 |
| 4 | 21 | 21.02 |

CORRECTION LENS SYSTEM DATA FOR BLUR CORRECTION

| CORRECTION LENS SYSTEM A | FIRST SURFACE NUMBER 6 | FINAL SURFACE NUMBER 13 |
|---|---|---|
| CORRECTION LENS SYSTEM FOCAL LENGTH fA | −7.420 mm | |
| CORRECTION LENS SYSTEM THICKNESS dA | 8.300 mm | |
| CORRECTION LENS SYSTEM CENTER OF ROTATION POSITION RA | 139.366 mm | |

| CORRECTION LENS SYSTEM B | FIRST SURFACE NUMBER 15 | FINAL SURFACE NUMBER 20 |
|---|---|---|
| CORRECTION LENS SYSTEM FOCAL LENGTH fB | 21.105 mm | |
| CORRECTION LENS SYSTEM THICKNESS dB | 10.820 mm | |
| CORRECTION LENS SYSTEM CENTER OF ROTATION POSITION RB | 30.000 mm | |

| | WIDE ANGLE | INTERMEDIATE | TELE-PHOTO |
|---|---|---|---|
| CORRECTION LENS SYSTEM | CORRECTION LENS SYSTEM B | CORRECTION LENS SYSTEM B | CORRECTION LENS SYSTEM A |
| CORRECTION LENS SYSTEM TILT ANGLE | 0.55 DEGREES | 1.50 DEGREES | −0.37 DEGREES |
| BLUR CORRECTION ANGLE | −3.0 DEGREES | −2.0 DEGREES | −2.0 DEGREES |

Numerical Embodiment 4

| UNIT mm | | | | |
|---|---|---|---|---|
| SURFACE DATA | | | | |
| SURFACE NUMBER i | ri | di | ndi | vdi |
| 1 | 78.206 | 1.45 | 1.91082 | 35.3 |
| 2 | 50.467 | 6.25 | 1.43875 | 94.9 |
| 3 | −399.632 | 0.05 | | |
| 4 | 47.286 | 3.80 | 1.49700 | 81.5 |

-continued

| UNIT mm | | | | |
|---|---|---|---|---|
| 5 | 181.357 | (VARIABLE) | | |
| 6 | 146.744 | 0.75 | 1.88300 | 40.8 |
| 7 | 8.429 | 4.14 | | |
| 8 | 81.073 | 0.60 | 2.00100 | 29.1 |
| 9 | 22.495 | 1.65 | | |
| 10 | −53.291 | 0.60 | 1.88300 | 40.8 |
| 11 | 53.291 | 0.10 | | |
| 12 | 19.117 | 2.25 | 1.95906 | 17.5 |
| 13 | 1012.136 | (VARIABLE) | | |
| 14 (STOP) | ∞ | (VARIABLE) | | |
| 15* | 9.480 | 2.90 | 1.53160 | 55.8 |
| 16* | −51.494 | 2.18 | | |
| 17 | 33.436 | 0.40 | 1.63540 | 23.9 |
| 18 | 8.679 | 0.97 | | |
| 19* | 21.478 | 2.20 | 1.53160 | 55.8 |
| 20* | −20.493 | (VARIABLE) | | |
| 21 | −40.801 | 0.70 | 1.53530 | 55.8 |
| 22 | 27.732 | (VARIABLE) | | |
| 23 | 24.471 | 2.85 | 1.53160 | 55.8 |
| 24 | −17.675 | 0.70 | | |
| 25 | −17.443 | 0.50 | 1.63540 | 23.9 |
| 26 | −36.514 | (VARIABLE) | | |
| 27 | ∞ | 0.80 | 1.51633 | 64.1 |
| 28 | ∞ | 0.50 | | |
| IMAGE PLANE | ∞ | | | |

ASPHERIC SURFACE DATA

FIFTEENTH SURFACE $K = -6.63523e-001 \quad A4 = -7.08490e-005 \quad A6 = -4.03698e-006$
$A8 = 1.25027e-008$

SIXTEENTH SURFACE $K = 0.00000e+000 \quad A4 = -6.30315e-005 \quad A6 = -4.65521e-006$
$A8 = 5.44848e-008$

NINETEENTH SURFACE $K = 0.00000e+000 \quad A4 = -1.59928e-004 \quad A6 = 8.20880e-007$
$A8 = -1.06954e-007$

TWENTIETH SURFACE $K = 0.00000e+000 \quad A4 = -1.07073e-004 \quad A6 = 2.49004e-006$
$A8 = -2.25220e-007$

VARIOUS KINDS OF DATA
ZOOM RATIO 57.03

| | WIDE ANGLE | INTERMEDIATE | TELEPHOTO |
|---|---|---|---|
| FOCAL LENGTH | 3.70 | 7.78 | 211.00 |
| F NUMBER | 3.50 | 4.50 | 7.07 |
| ANGLE OF VIEW | 40.66 | 26.48 | 1.05 |
| IMAGE HEIGHT | 3.18 | 3.88 | 3.88 |
| TOTAL LENS LENGTH | 96.92 | 84.45 | 150.26 |
| BF | 10.11 | 14.19 | 9.98 |
| d5 | 0.75 | 1.76 | 69.76 |
| d13 | 31.50 | 12.39 | 1.00 |
| d14 | 14.96 | 10.36 | 0.50 |
| d20 | 2.62 | 3.17 | 8.90 |
| d22 | 1.95 | 7.55 | 25.08 |
| d26 | 9.08 | 13.16 | 8.95 |

ZOOM LENS UNIT DATA

| UNIT | FIRST SURFACE | FOCAL LENGTH |
|---|---|---|
| 1 | 1 | 89.55 |
| 2 | 6 | −8.67 |
| 3 | 15 | 16.61 |
| 4 | 21 | −30.73 |
| 5 | 23 | 30.38 |

-continued

UNIT mm

CORRECTION LENS SYSTEM DATA FOR BLUR CORRECTION

| CORRECTION LENS SYSTEM A | FIRST SURFACE NUMBER 6 | FINAL SURFACE NUMBER 13 |
|---|---|---|
| CORRECTION LENS SYSTEM FOCAL LENGTH fA | −8.674 mm | |
| CORRECTION LENS SYSTEM THICKNESS dA | 10.092 mm | |
| CORRECTION LENS SYSTEM CENTER OF ROTATION POSITION RA | 190.000 mm | |

| CORRECTION LENS SYSTEM B | FIRST SURFACE NUMBER 15 | FINAL SURFACE NUMBER 20 |
|---|---|---|
| CORRECTION LENS SYSTEM FOCAL LENGTH fB | 16.610 mm | |
| CORRECTION LENS SYSTEM THICKNESS dB | 8.645 mm | |
| CORRECTION LENS SYSTEM CENTER OF ROTATION POSITION RB | 5.100 mm | |

| | WIDE ANGLE | INTERMEDIATE | TELE-PHOTO |
|---|---|---|---|
| CORRECTION LENS SYSTEM | CORRECTION LENS SYSTEM A | CORRECTION LENS SYSTEM A | CORRECTION LENS SYSTEM A |
| CORRECTION LENS SYSTEM TILT ANGLE | −0.10 DEGREES | −0.20 DEGREES | −0.31 DEGREES |
| CORRECTION LENS SYSTEM | | | CORRECTION LENS SYSTEM B |
| CORRECTION LENS SYSTEM TILT ANGLE | | | −1.00 DEGREES |
| BLUR CORRECTION ANGLE | −2.0 DEGREES | −4.0 DEGREES | −1.0 DEGREES |

TABLE 1

| CONDITIONAL EXPRESSIONS | EMBODIMENT 1 | EMBODIMENT 2 | EMBODIMENT 3 | EMBODIMENT 4 |
|---|---|---|---|---|
| (1) | 10.45 | 13.78 | 16.79 | 18.83 |
| (2) | 1.06 | 8.60 | 2.77 | 0.59 |
| (3) | 9.45 | 12.86 | 18.78 | 21.90 |
| (4) | 0.57 | 3.66 | 1.42 | 0.31 |
| (5) | 0.166 | 0.118 | 0.201 | 0.097 |
| (6) | 0.298 | 0.243 | 0.571 | 0.185 |
| (7) | 0.134 | 0.056 | 0.125 | 0.041 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-119440, filed Jun. 10, 2014 and Japanese Patent Application No. 2015-089583, filed Apr. 24, 2015 which are hereby incorporated by reference herein in their entirety.

The invention claimed is:

1. A zoom lens comprising, in order from an object side to an image side:
a first lens unit having a positive refractive power;
a second lens unit having a negative refractive power;
a third lens unit having a positive refractive power; and
a rear lens group that has one or more lens units,
wherein spacings between lens units adjacent to each other change during zooming,
wherein at least of a part of the second lens unit constitutes a first correction lens system that is rotatable about a first center of rotation, which is one point on an optical axis or in the vicinity of the optical axis, during image blur correction,
wherein at least of a part of an optical system disposed on the image side of the second lens unit constitutes a second correction lens system that is rotatable about a second center of rotation, which is one point on an optical axis or in the vicinity of the optical axis, during image blur correction,
wherein the first center of rotation is positioned on the image side of a surface vertex of a lens surface of the first correction lens system closest to the object side, and
wherein the second center of rotation is positioned on the image side of a surface vertex of a lens surface of the second correction lens system closest to the object side.

2. The zoom lens according to claim 1, wherein a position of the first center of rotation is different from a position of the second center of rotation.

3. The zoom lens according to claim 1, wherein image blur correction at a wide-angle end is performed by rotating the first correction lens system, and image blur correction at a telephoto end is performed by rotating the first correction lens system and the second correction lens system.

4. The zoom lens according to claim 1, wherein image blur correction at a wide-angle end is performed by rotating the second correction lens system, and image blur correction at a telephoto end is performed by rotating the first correction lens system.

5. The zoom lens according to claim 1, wherein the following conditional expression is satisfied, $$8.5 < RA/dA < 20.0,$$

where RA represents a distance from a surface vertex of a lens surface of the first correction lens system close to the object side to the first center of rotation and dA represents a thickness of the first correction lens system on the optical axis.

6. The zoom lens according to claim 1, wherein the following conditional expression is satisfied, $$0.3 < RB/dB < 10.5,$$

where RB represents a distance from a surface vertex of a lens surface of the second correction lens system close to the object side to the second center of rotation and dB represents a thickness of the second correction lens system on the optical axis.

7. The zoom lens according to claim 1, wherein the following conditional expression is satisfied, $$7.5 < |RA/fA| < 22.5,$$

where RA represents a distance from a surface vertex of a lens surface of the first correction lens system close to the object side to the first center of rotation and fA represents a focal length of the first correction lens system.

8. The zoom lens according to claim 1, wherein the following conditional expression is satisfied, $0.3<|RB/fB|<4.5$, where RB represents a distance from a surface vertex of a lens surface of the second correction lens system close to the object side to the second center of rotation and fB represents a focal length of the second correction lens system.

9. The zoom lens according to claim 1, wherein the following conditional expression is satisfied, $0.07<|fA/f1|<0.25$, where fA represents that a focal length of the first correction lens system and f1 represents a focal length of the first lens unit.

10. The zoom lens according to claim 1, wherein the following conditional expression is satisfied, $0.19<|fB/f1|<0.70$, where fB represents a focal length of the second correction lens system and f1 represents a focal length of the first lens unit.

11. The zoom lens according to claim 1, wherein the following conditional expression is satisfied, $0.02<fW/f1<0.35$, where f1 represents a focal length of the first lens unit and fW represents a focal length of the zoom lens at a wide-angle end.

12. The zoom lens according to claim 1, wherein the first correction lens system is the entirety of the second lens unit.

13. The zoom lens according to claim 1, wherein the second correction lens system is constituted by an entirety or a part of the third lens unit.

14. The zoom lens according to claim 1, wherein the rear lens group includes, in order from the object side to the image side, a fourth lens unit having a negative refractive power and a fifth lens unit having a positive refractive power, and the first to fifth lens units move along loci different from each other during zooming.

15. The zoom lens according to claim 1, wherein the rear lens group includes a fourth lens unit having a positive refractive power, and the second to fourth lens units move along loci different from each other during zooming.

16. The zoom lens according to claim 15, wherein the second correction lens system is constituted by an entirety of the third lens unit and an entirety of the fourth lens unit.

17. A zoom lens comprising a plurality of lens units,
wherein spacings between lens units adjacent to each other change during zooming,
wherein the zoom lens has a plurality of correction lens systems that are rotatable about a center of rotation, which is one point on an optical axis or in the vicinity of the optical axis, during image blur correction,
wherein the image blur correction is performed by rotating all the correction lens systems in a first zoom range, and
wherein the image blur correction is performed by rotating only a part of the correction lens systems in a second zoom range different from the first zoom range.

18. An image pickup apparatus comprising:
a zoom lens comprising, in order from an object side to an image side:
a first lens unit having a positive refractive power;
a second lens unit having a negative refractive power;
a third lens unit having a positive refractive power; and
a rear lens group that has one or more lens units,
wherein spacings between lens units adjacent to each other change during zooming,
wherein at least of a part of the second lens unit constitutes a first correction lens system that is rotatable about a first center of rotation, which is one point on an optical axis or in the vicinity of the optical axis, during image blur correction,
wherein at least of a part of an optical system disposed on the image side of the second lens unit constitutes a second correction lens system that is rotatable about a second center of rotation, which is one point on an optical axis or in the vicinity of the optical axis, during image blur correction,
wherein the first center of rotation is positioned on the image side of a surface vertex of a lens surface of the first correction lens system closest to the object side, and
wherein the second center of rotation is positioned on the image side of a surface vertex of a lens surface of the second correction lens system closest to the object side; and
an image pickup element that receives an image which is formed through the zoom lens.

* * * * *